(12) United States Patent
Sun

(10) Patent No.: US 9,206,550 B2
(45) Date of Patent: Dec. 8, 2015

(54) ANTI-COUNTERFEIT METHOD FOR RANDOM TEXTURE AND RECOGNIZER THEREOF

(75) Inventor: Xianlin Sun, Shanghai (CN)

(73) Assignee: SHANGHAI KOS SECURITY PAPER TECHNOLOGY CO., LTD., Shanghai (CN)

( * ) Notice: Subject to any disclaimer, the term of this patent is extended or adjusted under 35 U.S.C. 154(b) by 131 days.

(21) Appl. No.: 13/498,301

(22) PCT Filed: Sep. 28, 2010

(86) PCT No.: PCT/CN2010/077406
§ 371 (c)(1),
(2), (4) Date: Mar. 28, 2012

(87) PCT Pub. No.: WO2011/035738
PCT Pub. Date: Mar. 31, 2011

(65) Prior Publication Data
US 2012/0183180 A1 Jul. 19, 2012

(30) Foreign Application Priority Data

Sep. 28, 2009 (CN) .......................... 2009 1 0196692
Oct. 10, 2009 (CN) .......................... 2009 1 0196991
Nov. 12, 2009 (CN) .......................... 2009 1 0198668
Jun. 17, 2010 (CN) .......................... 2010 1 0203801

(51) Int. Cl.
*G06K 9/00* (2006.01)
*D21H 15/06* (2006.01)
*D21H 21/40* (2006.01)

(52) U.S. Cl.
CPC ............... *D21H 15/06* (2013.01); *D21H 21/40* (2013.01); *G06K 9/00* (2013.01); *G06K 9/00577* (2013.01)

(58) Field of Classification Search
CPC ............ G06K 9/00577; G06K 9/4661; G07D 7/2033; G07D 7/2041; G07D 7/205
See application file for complete search history.

(56) References Cited

U.S. PATENT DOCUMENTS 5,974,150 A * 10/1999 Kaish et al. .................... 713/179
6,970,236 B1 * 11/2005 Markantes et al. ............. 356/71
(Continued)

FOREIGN PATENT DOCUMENTS

| CN | 2715245 Y | 8/2005 |
| CN | 101519857 A | 9/2009 |
| WO | WO 2009105970 A1 * | 9/2009 |

OTHER PUBLICATIONS

Renesse, "3DAS: a 3dimensional-structure authentication system," European Convention on Security and Detection 1005, IEEE conference publication No. 408 (1995) p. 45, 1995.*

*Primary Examiner* — Anand Bhatnagar
*Assistant Examiner* — Soo Park
(74) *Attorney, Agent, or Firm* — Maschoff Brennan

(57) ABSTRACT

An anti-counterfeit method for random textures and a recognizer thereof The method includes: A. selecting texture material 2 with texture elements 1 distributed randomly; B. a recognition system storing inherent recognition features J of texture elements 1; C. extracting random features S of distribution of texture element 1 and storing in the recognition system, texture material 2 being anti-counterfeit identification 3; D. the recognition system extracting features J' and random features S' of texture elements 1' to be recognized on anti-counterfeit identification 3', and comparing respectively features J' with recognition features J as well as random features S' and random features S. If the compared results do not match, anti-counterfeit identification 3' is judged not to be anti-counterfeit identification 3. Otherwise, anti-counterfeit identification 3' is judged to be anti-counterfeit identification 3. The method can prevent inherent features of a texture element from being imitated and deceived by printed texture elements.

20 Claims, 13 Drawing Sheets

(56) References Cited

U.S. PATENT DOCUMENTS

| | | | | |
|---|---|---|---|---|
| 7,835,563 | B2* | 11/2010 | Hampp | 382/135 |
| 7,878,398 | B2* | 2/2011 | Chen et al. | 235/454 |
| 8,121,386 | B2* | 2/2012 | Rancien | 382/141 |
| 2003/0136837 | A1* | 7/2003 | Amon et al. | 235/435 |
| 2006/0244253 | A1 | 11/2006 | Wei | |
| 2007/0170265 | A1* | 7/2007 | Sinclair et al. | 235/491 |
| 2008/0226297 | A1* | 9/2008 | Sinclair et al. | 398/139 |
| 2011/0008606 | A1* | 1/2011 | Sun | 428/297.4 |

* cited by examiner

ANTI-COUNTERFEIT METHOD FOR RANDOM TEXTURE AND RECOGNIZER THEREOF

TECHNICAL FIELD

This invention involves an anti-counterfeit method, especially an anti-counterfeit method for random texture and its recognizer.

TECHNICAL BACKGROUND

A basic principle of random texture anti-counterfeit technology is that the producer utilizes random feature distribution of texture elements formed in random process, to judge a product's authenticity via comparing whether it is conformity with stored random features, for purpose of anti-counterfeit. Currently, there is a fatal fault in random texture anti-counterfeit technology, which is unable to distinguish imitation deception of printed texture elements under condition of a recognition system. If printed texture elements (ink, hot-stamping and etc.) can imitate random textures while the imitation can not be distinguished by a recognition system, the faker can easily copy in large amount with low cost, which in turn will make anti-counterfeit effects of the random texture anti-counterfeit technology into uselessness or defeat.

Improving resolving power of a recognition system without cost considering can distinguish imitation deception of printed texture elements, but increased cost of a recognizer used in recognizing will certainly make promotion and utilization of the technology into difficulty. Texture elements on anti-counterfeit material shall be photographed by using a super-high power microscope for sampling and storing, and then compared also by using a super-high power microscope when recognizing, this manner is not only in very high cost for sampling, but also is difficult for carrying with the super-high power microscope, and contra-positioning and focusing is difficult when recognizing with a recognizer in very high cost.

In current technology, there is also a laser surface verification system; its principle is to radiate surface's textures of texture material by using a bunch of laser, diffused reflection lights with different intensities at multi-angles are sampled and stored by using several CCD receivers, when recognizing, the recognizers used in almost the same process of sampling and storing is adopted for sampling and comparing. This system has very high requirement on contra-positioning when recognizing, not only is the recognition distance required as the same as that when sampling and storing, but also the laser-radiation angle shall be the same, as well as sampling directions shall be all the same when recognition by using the laser surface verification system. When sampling and storing, any deviation may cause wrong judgment. And it has higher requirement on the laser surface verification system and shall be equipped with removable scanner, its operation is too strict to popularize, especially in area of civil goods.

Chinese patent CN1350260 "Anti-counterfeit method for random texture" involves an anti-counterfeit method that uses random structure texture element characteristic of material as an anti-counterfeit information carrier, which is difficult to repeatedly imitate by current technology; after process of scanning, recognizing and encrypting the random texture element images by computer, it forms another encrypted and converted image that is then directly printed onto the product of original random texture element images; the encrypted and converted image carries random feature information of the original random texture element images, and product's authenticity is identified via comparing two random texture element distribution images by using an independent recognizer equipped with corresponding decryption program. Said recognition system in this document does not involve any functions of preventing imitation deception of printed texture elements, which causes easily printing imitation of random features of their texture elements in low cost.

Chinese patent CN1430175 "An encryption anti-counterfeit method based on material characteristics" involves an encryption anti-counterfeit method based on material characteristics, including a signing treatment process to form anti-counterfeit information on safety protectors and a checking treatment process to recognize the anti-counterfeit information. It is designed based on a principle of "Complex random phenomenon is difficult to repeat and artificially control"; it can prevent copying and deceiving, and effectively recognize authenticity of a material. The signing process includes: in manufacturing process of paper for goods label or bill, tangible material is mixed to form randomly distributed texture element structure and to set a collection area of texture element structure images; the texture element structure is converted into image information able to be processed by computer, and image features are extracted from the image information by using image process method; the feature, allowable error of image recognition, and anti-deceiving information are used to prepare a bar code that is then printed onto bar code area; plaintext message is encrypting-processed by private key and via signature algorithm to form digital signature; the digital signature as an anti-counterfeit identification code is prepared onto the safety protectors. The checking treatment process is a contrary operation of the process mentioned above. The content of this document is the same as that in Chinese patent CN1350260, said recognition system either does not involve any functions on how to prevent imitation deception of the printed texture elements.

A key problem is to provide a simple, low-cost and easily operable recognition system that can check random features of texture element distribution, and prevent inherent features of texture elements from imitating by low-cost technique and method, especially deceiving and imitating by printed texture elements.

SUMMARY OF THE INVENTION

The purpose of this invention is to provide an anti-counterfeit method of random texture and its recognizer, which can realize inherent feature of texture elements not to be imitated and deceived by printed texture elements, and can support a cheap and simple recognizer.

Definitions of some terms shall be explained before describing the solutions.

1. Texture element: Basic material elements are used to form random features S, for example, one fiber, one dot, one sheet and etc.

2. Printed texture element: Texture elements are formed by using various printing manners in combination of various printing inks, wherein said various printing manners include offset printing, gravure printing, relief printing, porous printing, electro-static printing, ink-jet printing and hot stamping and etc.

3. Imitation of printed texture elements: Under condition of determined recognition system, a faker imitates random features S of texture elements distributed on anti-counterfeit identification by printed texture elements. Because preparation of printed texture elements is very low in cost, if said recognition system can not recognize these printed texture elements, the anti-counterfeit effects will be lost.

4. Condition of a recognition system: It Includes spectrum characteristic, intensity, direction, number of radiating light source in a recognition system, and geometric resolution of a recognizer, color resolution of a recognizer, process manner of data process model (DSP) on texture element images and etc.

5. Random feature S: Features are extracted by the system, formed by texture elements in random process and related to random process. For example, for texture elements in dot form, the random feature S is the position of that dot, it can be represented by coordinates of this dot; for texture elements in straight fiber form, random features S are fiber's position and orientation in length direction, it can be represented by coordinates of two ends of the fiber; for texture elements of bended fiber, random features S are fiber's position, orientation in length direction, and orientation of bending, it can be represented by coordinates of two ends and a middle point of the fiber; for a straight fiber with a special structure, random feature S can also be rotation orientation of fiber's cross section, and could be represented by a rotation angle.

In addition, if there are several color features and several geometric features in the texture elements on a same anti-counterfeit identification, color features and geometric features on a certain position are random; in this case, color and geometric features can also be used as random features S.

6. Placement costs of random features S of anti-counterfeit identification: When said recognition system can distinguish said texture elements and the printed texture elements, a faker can not imitate said texture elements by using printed texture elements, but for deceiving the recognition system, the faker may use said texture elements to form similar random features S via artificial placement. Costs for artificially placing the anti-counterfeit identification are equal to product of quantity of texture elements on anti-counterfeit identification multiplied by artificial placement costs for each texture element. When artificial costs for placing anti-identification are higher than or equal to profits of faking, faking can be restrained. Factors directly related to costs for said placement are: type of random feature S, accuracy of extracting random feature S (position accuracy, orientation accuracy and etc.), size of texture elements and etc.

7. Inimitable: It can be understood at two levels, first level: under condition of current technology or current potential technology, the texture elements and distributed random features S thereof cannot be imitated by printing; second level: there is no any profits for faking and imitating texture elements and distributed random features S thereof, that is, costs for a faker to imitate a sheet of anti-counterfeit identification is higher or equal to the profit from faking.

The purpose of this invention is realized by:

An anti-counterfeit method for random texture that includes following steps:

A. Selecting texture material 2 distributed randomly with texture elements 1;

B. Storing inherent recognition features J of the texture elements 1 into a recognition system;

C. Extracting random features S of distribution of texture elements 1 and storing them into the recognition system to make texture material 2 as an anti-counterfeit identification 3;

D. In recognizing, the recognition system extracts features J' and random features S' of texture elements 1' to be recognized on anti-counterfeit identification 3' to be recognized, respectively compares features J' with recognition features J as well as random features S' with random features S, if one or two of the compared results does not match, the anti-counterfeit identification 3' to be recognized is judged not to be said anti-counterfeit identification 3; if both compared results match, the anti-counterfeit identification 3' to be recognized is judged to be said anti-counterfeit identification 3. When recognizing in practice, if the anti-counterfeit identification 3' to be recognized is judged as being said anti-counterfeit identification 3, user shall be informed that the product with this anti-counterfeit identification 3' is a genuine product; if the anti-counterfeit identification 3' to be recognized is judged as not being said anti-counterfeit identification 3, user shall be informed that the product with this anti-counterfeit identification 3' is a counterfeit.

Effects of this invention are: because of selecting special texture elements 1 and using special and inherent recognition features J in said texture elements 1, which cannot be imitated by printed texture elements, this recognition features J can make the recognition system simple and reliable in recognition process, and make a recognizer of the recognition system smaller in size and lower in costs, and furthermore can prepare the anti-counterfeit identification in largely reduced costs and make faking in higher costs.

Figure 1:
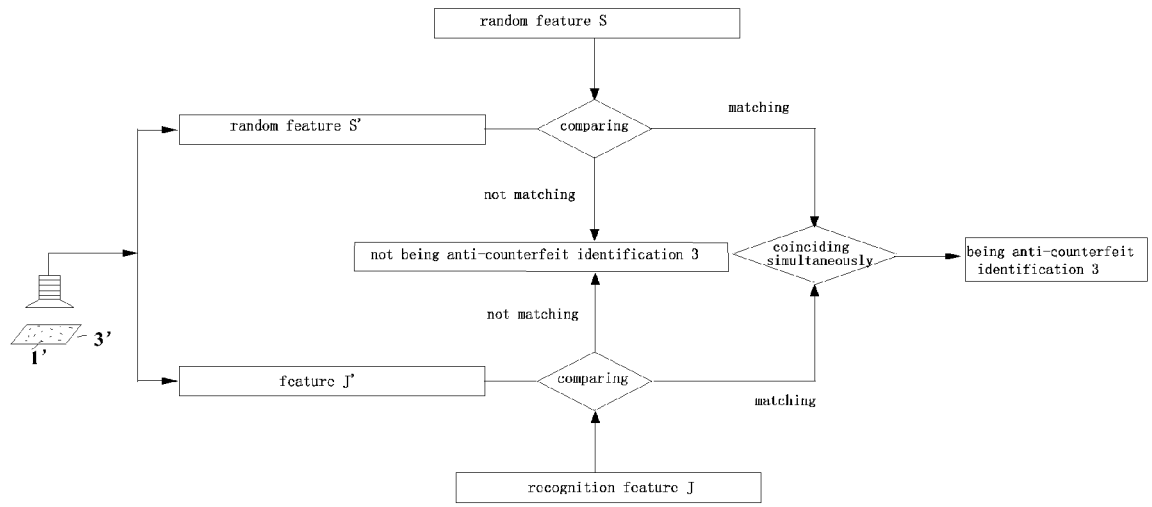
FIG. 1 is a recognition flow chart of random textures.

DETAILED DESCRIPTION OF THE INVENTION:

This invention provides an anti-counterfeit method of random texture, as shown in FIG. 1, following steps are included:

A. texture material 2 with texture elements 1 distributed randomly is selected;

B. a recognition system stores inherent recognition features J of texture element 1;

C. random features S of distribution of texture elements 1 are extracted and stored in the recognition system, and texture material 2 is enabled to be anti-counterfeit identification 3;

D. in recognizing, the recognition system extracts features J' and random features S' of texture elements 1' to be recognized on anti-counterfeit identification 3' to be recognized, and compares respectively features J' with recognition features J as well as random features S' and random features S, if one or two of the compared results does not match, anti-counterfeit identification 3' to be recognized is judged not to be anti-counterfeit identification 3, if both compared results match, anti-counterfeit identification 3' to be recognized is judged to be anti-counterfeit identification 3. When recognizing in practice, if the anti-counterfeit identification 3' to be recognized is judged as being said anti-counterfeit identification 3, user shall be informed that the product with this anti-counterfeit identification 3' is a genuine product; if the anti-counterfeit identification 3' to be recognized is judged as not being said anti-counterfeit identification 3, user shall be informed that the product with this anti-counterfeit identification 3' is a counterfeit.

Said texture elements 1 are texture elements with recognition features J that cannot be imitated by printed texture elements.

Furthermore, said texture elements 1 are texture elements with recognition features J that cannot be imitated by printed texture elements under condition of said recognition system.

Wherein, said texture element 1 is an optical-angle changing texture element 4, when light source radiates said optical-angle changing texture element 4 from different set radiating angles, the optical-angle changing texture element 4 appears different optical characteristics, and the difference of said optical characteristics can be recognized by the recognition system. This optical characteristic differences formed by said optical-angle changing texture element 4 under radiation of light source from different angles are closely related with the selection of optical-angle changing texture element 4, spectrum characteristic of light source, radiation angle, as well as accuracy, color resolution, image treatment manner of the recognizer, and etc. Essence of this difference mainly reflects three-dimensional characteristic of optical-angle changing texture element 4, but a printed texture element is impossible to have these three-dimensional characteristics.

Said texture element 1 is an optical-angle color-changing texture element 5, when light source radiates said optical-angle color-changing texture element 5 from different set radiating angles, the optical-angle color-changing texture element 5 appears different spectrum characteristics, and the difference of said spectrum characteristics can be recognized by the recognition system.

Said texture element 1 is a fluorescent optical-angle color-changing texture element 6, when excitation light source radiates said fluorescent optical-angle color-changing texture element 6 from different set radiating angles, the fluorescent optical-angle color-changing texture element 6 appears different spectrum characteristics, and the difference of said spectrum characteristics can be recognized by the recognition system.

Figure 2:
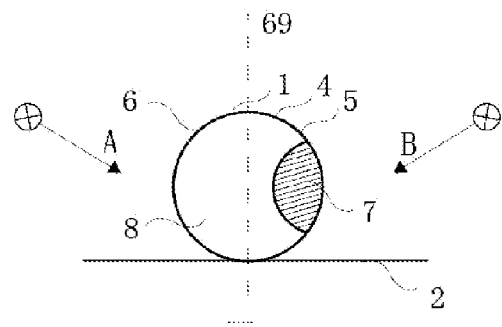
FIG. 2-FIG. 10 are structure drawings of the fluorescent optical-angle color-changing texture element 6.

Furthermore, said fluorescent optical-angle color-changing texture element 6 is a fiber, the cross section of said fiber is composed of two material sections: first luminous material section 7 and blocking material section 8; the blocking material section 8 is a blocking material that is able to obstruct exciting light of the first luminous material section 7, said fiber includes following structures:

Structure 1 (see FIG. 2): Longitudinal mid vertical plane of said fiber is blended, and said longitudinal mid vertical plane is composed of midperpendicular lines 69 on each cross section of said fiber. Cross section of said fiber is in circular form. The first luminous material section 7 is located at one side of said longitudinal mid vertical plane.

Structure 2: Said fiber is in flat form. Longitudinal mid vertical plane of said fiber is blended, and said longitudinal mid vertical plane is composed of short-axis midperpendicular lines 69 on each cross section of said fiber. Said first luminous material section 7 is located at one side of said longitudinal mid vertical plane.

Figure 3:
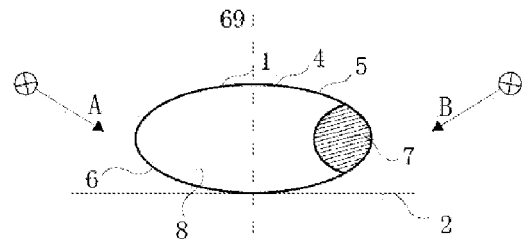

Structure 3 (see FIG. 3): Said fiber is a straight fiber in flat form. Said first luminous material section 7 is located at one side of said longitudinal mid vertical plane, and said longitudinal mid vertical plane is composed of short-axis midperpendicular lines 69 on each cross section of said fiber.

Said structure 1, structure 2 and structure 3 have their inherent orientations when attaching freely on the surface of the texture material 2. The purpose of such design is that, during recognizing, excitation light source from a recognizer radiates said fluorescent optical-angle color-changing texture element 6 from different angles, there are obvious differences in light intensity of spectrum characteristic shown by its emission light. Said differences have inherent corresponding relationship, and said inherent corresponding relationship can not be realized by printed texture elements, so it is used as recognition feature J of the fluorescent optical-angle color-changing texture element 6, which is utilized to judge true or false of the texture element 1' to be recognized in order to prevent imitation and fraud via printed texture elements.

Figure 4:
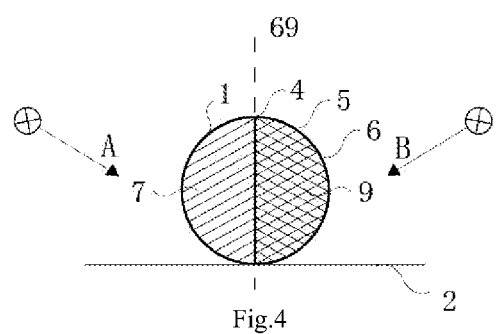

As shown in FIG. 4, fluorescent optical-angle color-changing texture element 6 is a fiber. Cross section of said fiber is in circular form, and said cross section is composed of two material sections: first luminous material section 7 and second luminous material section 9. Emission lights of the first luminous material section 7 and the second luminous material section 9 appear different spectrum characteristics. Longitudinal mid vertical plane of said fiber is bended, and said longitudinal mid vertical plane is composed of midperpendicular lines 69 of each cross section of said fiber. Said first luminous material section 7 and said second luminous material section 9 are symmetrically located at two sides of the longitudinal mid vertical plane. Said structure can attach freely on the surface of the texture material 2, with inherent orientation. The purpose of this design is that, when excitation light source from the recognizer radiates said fluorescent optical-angle color-changing texture element 6 from different angles, its emission lights show different spectrum characteristics. The difference of said spectrum characteristics has inherent corresponding relationship, and said inherent corresponding relationship can not be realized by printed texture elements, so it is used as recognition feature J of the fluorescent optical-angle color-changing texture element 6, which is utilized to judge true or false of the texture element 1' to be recognized to prevent imitation and deception via a printed texture element.

Figure 5:
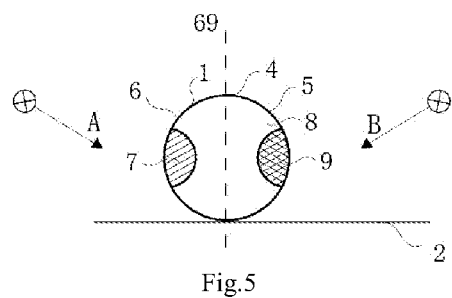

Said fluorescent optical-angle color-changing texture element 6 is a fiber, and cross section of said fiber is composed of three material sections: first luminous material section 7, blocking material section 8 and second luminous material section 9. Emission lights of the first luminous material section 7 and the second luminous material section 9 appear different spectrum characteristics, and the blocking material section 8 is a blocking material that can obstruct exciting lights of the first luminous material section 7 and the second luminous material section 9. The blocking material section 8 is located between the first luminous material section 7 and the second luminous material section 9. Said fiber includes following structures:

Structure 1 (see FIG. 5): Longitudinal mid vertical plane of said fiber is bended, and said longitudinal mid vertical plane is composed of midperpendicular lines 69 of each cross section of said fiber. Cross section of said fiber is in circular form. The first luminous material section 7 and the second luminous material section 9 are symmetrically located at two sides of said longitudinal mid vertical plane.

Figure 6:
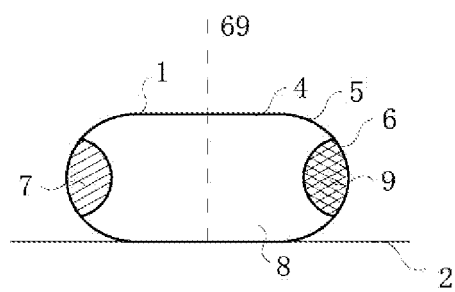

Structure 2 (see FIG. 6): Said fiber is in flat form. Longitudinal mid vertical plane of said fiber in bended, and said longitudinal mid vertical plane is composed of short-axis midperpendicular lines 69 of each cross section of said fiber. The first luminous material section 7 and the second luminous material section 9 are symmetrically located at two sides of said longitudinal mid vertical plane.

Structure 3: Said fiber is a straight fiber in flat form. First luminous material section 7 and second luminous material section 9 are symmetrically located at two sides of said longitudinal mid vertical plane, and said longitudinal mid vertical plane is composed of short-axis midperpendicular lines 69 of each cross section of said fiber.

The fluorescent optical-angle color-changing texture element 6 with said structure 1, the fluorescent optical-angle color-changing texture element 6 with the structure 2, and the fluorescent optical-angle color-changing texture element 6 with the structure 3 freely attach on the surface of the texture material 2, with their inherent orientations. During recognizing, excitation light source of a recognizer radiates said fluorescent optical-angle color-changing texture element 6 from different angles, their emission lights show different spectrum characteristics. The difference of said spectrum characteristics has inherent corresponding relationship, and said inherent corresponding relationship can not be realized by printed texture elements, so it is used as recognition feature J of the fluorescent optical-angle color-changing texture element 6, which is utilized to judge true or false of the texture element 1' to be recognized to prevent imitation and deception via a printed texture element.

Figure 7:
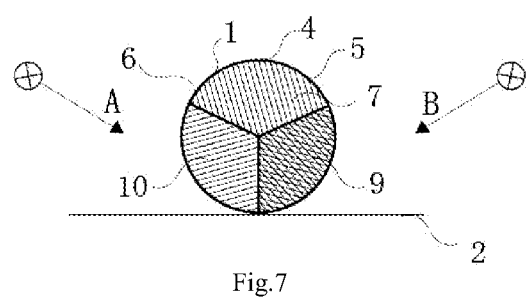

Said fluorescent optical-angle color-changing texture element 6 is a fiber. And said fluorescent optical-angle color-changing texture element 6 is at least composed of three material sections that distribute on the cross section of said fiber and extend together along with length direction of said fiber: first luminous material section 7, second luminous material section 9 and third luminous material section 10. Emission lights of said at least three luminous material sections show different spectrum characteristics. Specially designed geometric distribution of said at least three luminous material sections enables said fiber to have at least two different exciting light radiation angles. When radiating said fluorescent optical-angle color-changing texture element 6, it will show different spectrum characteristics. Said fiber includes following structures:

Structure 1 (see FIG. 7): Cross section of said fiber is in circular form. There are three material sections having different spectrum characteristics of emission lights distributed on said cross section: first luminous material section 7, second luminous material section 9 and third luminous material section 10. Said three luminous material sections are in fan-shaped form and adjacent with each other.

Figure 8:
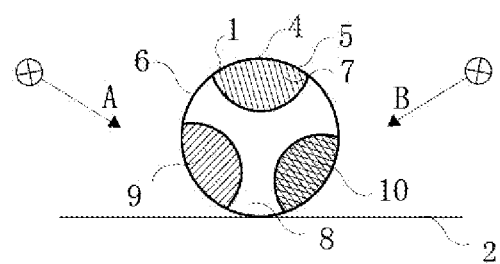

Structure 2 (see FIG. 8): The cross section of said fiber is in circular form. There are three luminous material sections having different spectrum characteristics of emission lights: first luminous material section 7, second luminous material section 9 and third luminous material section 10, and also a blocking material section 8 distributed on said cross section. Said blocking material section 8 is located among said three luminous material sections.

Figure 9:
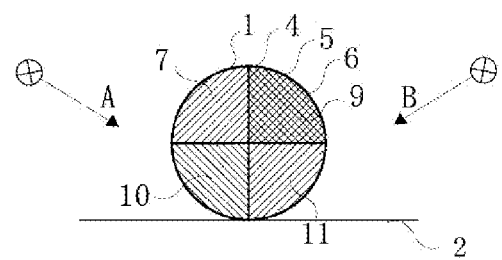

Structure 3 (see FIG. 9): The cross section of said fiber is in circular form. There are four material sections having different spectrum characteristics of emission lights distributed on said cross section: first luminous material section 7, second luminous material section 9, third luminous material section 10 and fourth luminous material section 11. Said four luminous material sections are in fan-shaped structure and adjacent with each other.

The fluorescent optical-angle color-changing texture element 6 with said structure 1, the fluorescent optical-angle color-changing texture element 6 with the structure 2, and the fluorescent optical-angle color-changing texture element 6 with the structure 3 freely attach on the surface of the texture material 2, and the orientation of fiber's cross section is random. During recognizing, excitation light source of a recognizer radiates said fluorescent optical-angle color-changing texture element 6 from different angles, their emission lights show different spectrum characteristics. Said difference and the rotation angle of the cross section have inherent corresponding relationship, and said inherent corresponding relationship can not be realized by printed texture elements. Said difference is used as recognition feature J of the fluorescent optical-angle color-changing texture element 6, which is utilized to judge true or false of the texture element to be recognized to prevent imitation and deception via printed texture elements. Because rotation orientation of the cross section is random, the rotation orientation of the fiber's cross section can be used as random feature S. When radiation angle of excitation light source is determined, spectrum characteristic of fluorescent optical-angle color-changing texture element 6 and rotation orientation has inherent corresponding relationship. The random feature S of rotation orientation of the fluorescent optical-angle color-changing texture element 6 can be obtained by following method: when storing fiber's random feature S, recording radiation direction of excitation light source and spectrum characteristics of fluorescent optical-angle color-changing texture element 6 at this radiation direction; during recognizing, though radiation angle of excitation light source of a recognizer is different with stored excitation light source radiation angle, the recognizer can identify such angle's difference, thus to determine the rotation orientation of the fluorescent optical-angle color-changing texture element 6.

Figure 10:
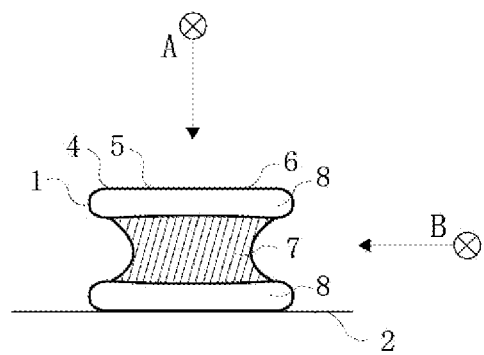

As shown in FIG. 10, the fluorescent optical-angle color-changing texture element 6 is distributed on texture material 2. There are at least first luminous material section 7 and blocking material sections 8 distributed on the cross section of the fluorescent optical-angle color-changing texture element 6. Structure design of said fluorescent optical-angle color-changing texture element 6 can guarantee that the blocking material section 8 is able to obstruct exciting light from radiating onto the first luminous material section 7 when the excitation light source radiates the surface of the texture material 2 vertically, and the excitation light source radiates onto the first luminous material section 7 when the excitation light source radiates surface of the texture material 2 in slope or parallel.

Figure 11:
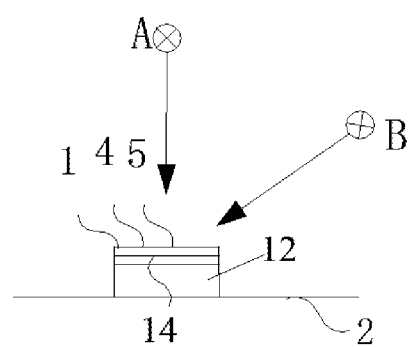
FIG. 11-FIG. 12 are structure drawings of the interference membrane texture elements 12.

Said texture element 1 is an interference membrane texture element 12 contained with multi-layer interference membranes 14. There are at least two different radiation angles, when radiating the interference membrane texture element 12, it shows different spectrum characteristics of emission light, and the difference of said spectrum characteristics can be recognized by a recognizer. Said interference membrane texture element 12 contains following structures:

Structure 1 (see FIG. 11): Interference membrane texture element 12 is in sheet form, wherein said multi-layer interference membrane 14 is parallel to the surface of texture material 2.

Figure 12:
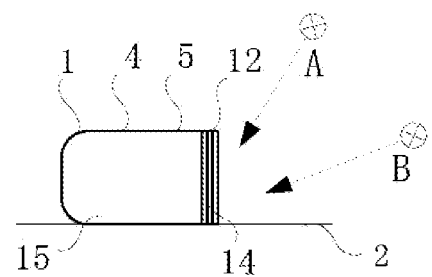

Structure 2 (see FIG. 12): Interference membrane texture element 12 is composed of two material sections: said multi-layer interference membranes 14 and a carrier 15. Said multi-layer interference membrane 14 is vertical to the surface of the texture material 2, and the carrier 15 supports said multi-layer interference membrane 14 being vertical to the surface of the texture material 2.

Said multi-layer interference membrane 14 is formed via vacuum-coating.

Furthermore, said multi-layer interference membrane 14 on the texture material 2 has at least two color-changing types. For example, red changes to blue, yellow changes to blue and etc. The purpose of such design is to avoid possibility from imitating the interference membrane texture element 12 via print-covering method.

Furthermore, forms of said interference membrane texture element 12 are in polygon, triangle, long belt, five-pointed star, meniscus and etc.

Said texture element 1 is a color optical-angle color-changing texture element 16, when radiating said color optical-angle color-changing texture element 16 by light source with different radiating angles, different reflected light spectrum characteristics will appear. The difference of said spectrum characteristics can be recognized by said recognition system.

The color of color optical-angle color-changing texture element means a spectrum area able to be sensed by a corresponded recognizer.

Said color optical-angle color-changing texture element 16 is a fiber, it contains following structures:

Structure 1: Longitudinal mid vertical plane of said fiber is bended, and said longitudinal mid vertical plane is composed of midperpendicular lines of each cross section of said fiber. Said cross section of the fiber is circle and is composed of two material sections: separating material section 17 and first color material section 18. The separating material section 17 can obstruct radiating light, and the first color material section 18 is located at one side of the longitudinal mid vertical plane.

Figure 13:
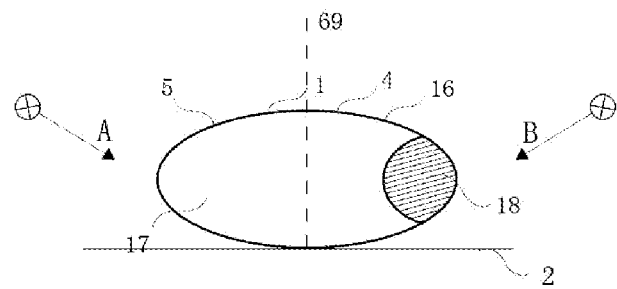
FIG. 13-FIG. 16 are structure drawings of the color optical angle color-changing texture element 16.

Structure 2 (see FIG. 13): Said fiber is in flat form. Longitudinal mid vertical plane of said fiber is bended, and said longitudinal mid vertical plane is composed of midperpendicular lines 69 of each cross section of said fiber. Said cross section of the fiber is composed of two material sections: separating material section 17 and first color material section 18. The separating material section 17 can obstruct radiating light, and the first color material section 18 is located at one side of the longitudinal mid vertical plane.

Structure 3: Said fiber is a straight fiber in flat form. The cross section of said fiber is composed of two material sections: separating material section 17 and first color material section 18. The separating material section 17 can obstruct radiating light, and the first color material section 18 is located at one side of the longitudinal mid vertical plane.

Structure 4: Longitudinal mid vertical plane of said fiber is bended, and said longitudinal mid vertical plane is composed of midperpendicular lines of each cross section of said fiber. Said cross section of the fiber is circle and is composed of three material sections: first color material section 18, second color material section 19 and separating material section 17. The first color material section 18 and the second color material section 19 appear different spectrum characteristics, and the separating material section 17 can obstruct radiating light. The separating material section 17 is located between the first color material section 18 and the second color material section 19, and the first color material section 18 and the second color material section 19 are located at two sides of the longitudinal mid vertical plane.

Figure 14:
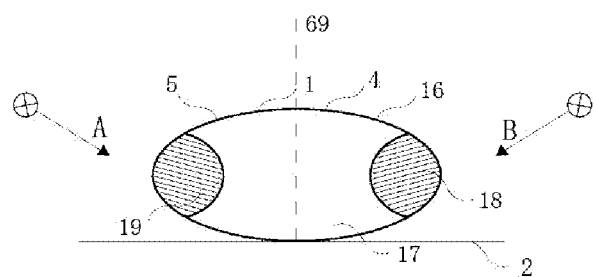

Structure 5 (sees FIG. 14): Said fiber is in flat form. Longitudinal mid vertical plane of said fiber is bended, and said longitudinal mid vertical plane is composed of midperpendicular lines 69 of each cross section of said fiber. Said cross section of the fiber is composed of three material sections: first color material section 18, second color material section 19 and separating material section 17. The first color material section 18 and the second color material section 19 appear different spectrum characteristics, and the separating material section 17 can obstruct radiating light. The separating material section 17 is located between the first color material section 18 and the second color material section 19, and the first color material section 18 and the second color material section 19 are located at two sides of the longitudinal mid vertical plane.

Structure 6: The said fiber is a straight fiber in flat form. The cross section of said fiber is composed of three material sections: first color material section 18, second color material section 19 and separating material section 17. The first color material section 18 and the second color material section 19 show different spectrum characteristics, and the separating material section 17 can obstruct radiating light. The separating material section 17 is located between the first color material section 18 and the second color material section 19, and the first color material section 18 and the second color material section 19 are located at two sides of the longitudinal mid vertical plane.

Figure 15:
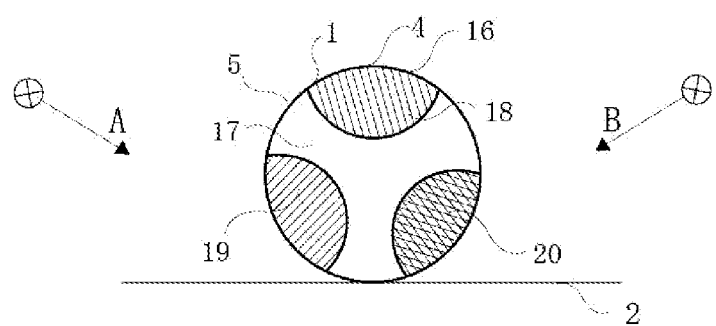

Structure 7: On cross section of said fiber there are at least three material sections distributed: first color material section 18, second color material section 19 and third color material section 20. Said at least three material sections appear different spectrum characteristics. Distribution of said at least three material sections are specially designed to enable said fiber have at least two different radiation angles of radiating lights, when radiating said fiber, their reflected lights appear different spectrum characteristics. Said fiber has structures as follows:

Structure 7-1 (see FIG. 15): The cross section of said fiber is in circular form. On the cross section of said fiber there are three material sections distributed with different spectrum characteristics of reflected lights: first color material section 18, second color material section 19 and third color material section 20, and a separating material section 17. The separating material section 17 is located among said three color material sections in interval way.

Figure 16:
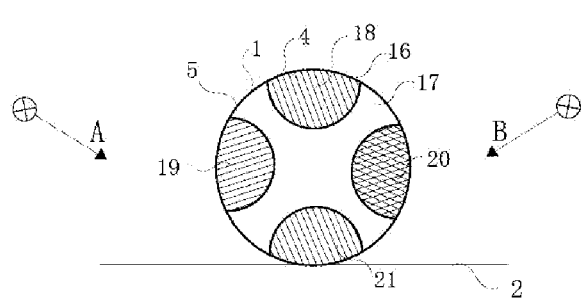

Structure 7-2 (see FIG. 16): The cross section of said fiber is in circular form. On the cross section of said fiber there are four color material sections distributed with different spectrum characteristics of reflected lights: first color material section 18, second color material section 19, third color material section 20 and fourth color material section 21, and a separating material section 17. The separating material section 17 is located among said four color material sections in interval way.

Said texture element 1 is a shadow texture element 22. Said shadow texture element 22 includes a shelter structure able to form shadows. When radiating said shadow texture element 22 from different set radiating angles, said shelter structure can form different shadows, and the difference of said shadows can be recognized by said recognition system.

The crux to adopt this optical characteristic of a shadow is to convert three-dimensional information of the shadow texture element 22 into corresponding two-dimensional optical characteristic information of the shadow, which can be easily recognized by the recognizer. It is impossible to, via printed texture elements, imitate this specially designed optical characteristics of shadow changed in compliance with radiating angles, and the difference of said two-dimensional shadow can be easily and cheaply collected and recognized by using low-costs recognizer.

Figure 17A:
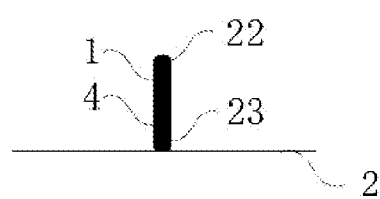
FIG. 17a-FIG. 27b are structure drawings of the shadow texture elements 22.

Furthermore, said shadow texture element 22 contains structures as follows:

Structure 1 (see FIGS. 17*a* and 17*b*): Shadow texture element 22 is a long-strip texture element 23. The cross section of said long-strip texture element 23 is in rectangular form, and long side of said rectangle is vertical to the surface of the texture material 2. Longitudinal mid vertical plane of said shadow texture element 22 is bended, and said longitudinal mid vertical plane is composed of midperpendicular lines, which is vertical to the surface of the texture material 2, on each cross section of said shadow texture element 22.

Figure 28A:
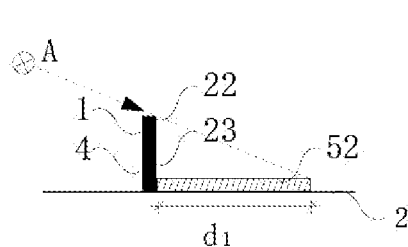
FIG. 28a-FIG. 30c are drawings of shadows formed by the shadow texture elements 22 under radiation of light sources A and B.
Figure 28B:
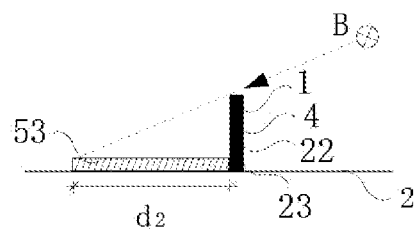
Figure 28C:
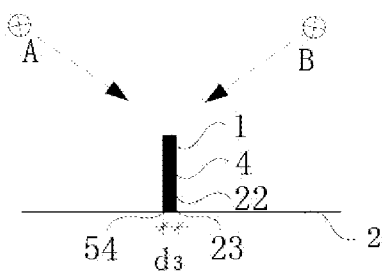

When recognizing by using the recognizer, three images can be extracted from said long-strip texture element 23 with the structure 1. Such as FIG. 28a, a shadow with length $d_1$ is formed under radiation at A angle of light source, and the shadow $d_1$ inclines to right side; in FIG. 28b, a shadow with length $d_2$ is formed under radiation at B angle of light source, and the shadow $d_2$ inclines to left side; in FIG. 28c, simultaneously radiating at A and B angles of light source, a shadow is just the width $d_3$ of the shelter structure. Lengths $d_1$ and $d_2$ have relationship with the length of the long side of the rectangle and the radiation angles, and this relationship cannot be formed by a printed texture element.

Figure 17B:
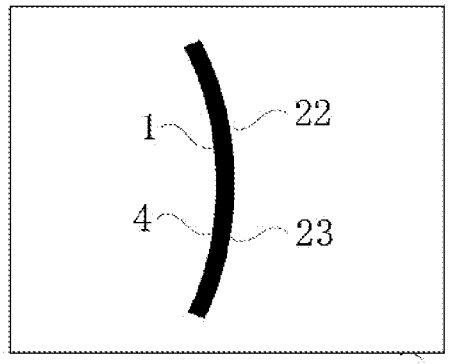

Random features S can collect two end-point's coordinates of the long-strip texture element 23 in FIG. 17b.

Figure 18A:
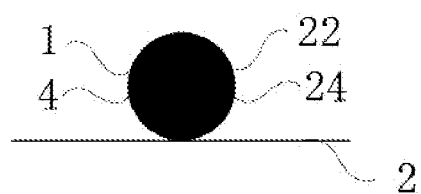

Structure 2 (see FIGS. 18a and 18b): Shadow texture element 22 is a sphere texture element 24.

Figure 29A:
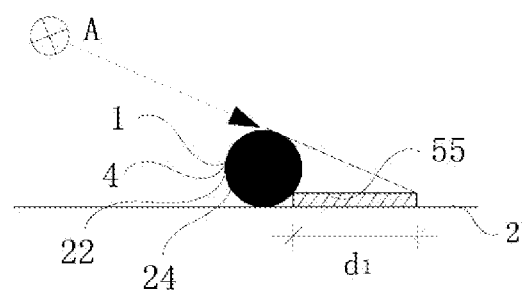
Figure 29B:
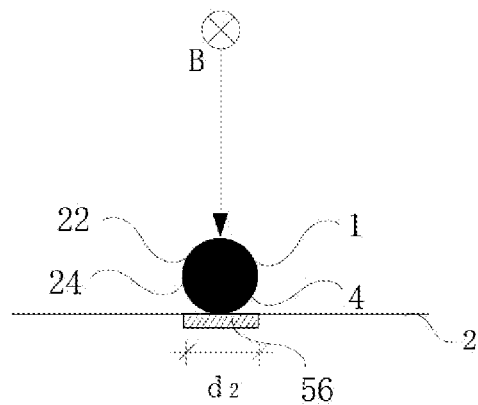

Said structure 2 is a sphere texture element 24, and two images can be extracted by a recognizer when recognizing In FIG. 29a, a shadow is formed in ellipse when light source at A angle radiates slantways said sphere texture element 24, and the length of its long axis is $d_1$, and the shadow $d_1$ inclines to right side; in FIG. 29b, a shadow is formed in circular form when light source at B angle vertical to surface of the texture material 2 radiates said sphere texture element 24, and diameter $d_2$ of said circle is a diameter of the sphere. This shadow relationship formed via sphere texture element 24 cannot be formed by a printed texture element.

Figure 18B:
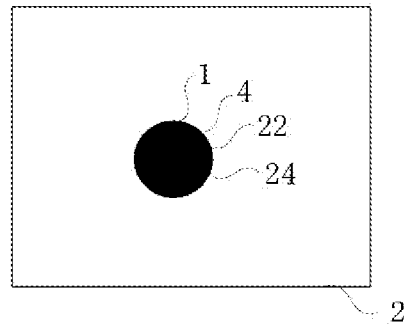

Random feature S can collect coordinates of sphere center in FIG. 18b.

Figure 19A:
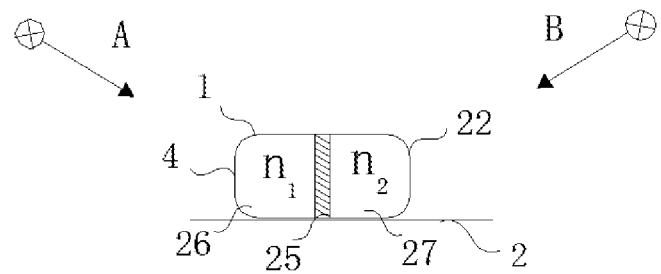

Structure 3 (see FIGS. 19a and 19b): Shadow texture element 22 is in flat form, and the flat plane of said shadow texture element 22 is parallel or approximately parallel to the surface of the texture material 2. Said shadow texture element 22 is composed of three material sections that extend along with length direction in parallel: shelter structure section 25, first transparent material section 26, and second transparent material section 27. Said shelter structure section 25 is located between said first transparent material section 26 and said second transparent material section 27. The cross section of said shelter structure section 25 is in rectangular form or approximate rectangular form, and long side of said rectangle or approximate rectangle is vertical to the surface of the texture material 2. Said first transparent material section 26 and said second transparent material section 27 have different refractive indexes.

For shadow texture element 22 with said structure 3, during recognizing, three images can be extracted by the recognizer. Such as FIG. 19a, light source at A angle radiates slantways said shadow texture element 22 to form a shadow length via refracting in the first transparent material section 26 with refractive index $n_1$, and light source at B angle radiates slantways said shadow texture element 22 to form the other shadow length via refracting in the second transparent material section 27 with refractive index $n_2$, the above two shadow lengths are not equal to each other. On the premise of same incident angle, this difference is caused by different refractive indexes of two different materials. When light source at A angle and light source at B angle simultaneously radiate said shadow texture element 22, shadow's width is equal to material thickness of shelter structure section. This shadow relationship formed by said shadow texture element 22 specially designed can not be formed by printed texture elements.

Figure 19B:
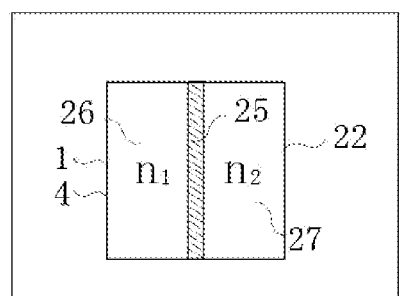

Random features S can collect coordinates of two end-points of the shelter structure section 25 in FIG. 19b.

Figure 20A:
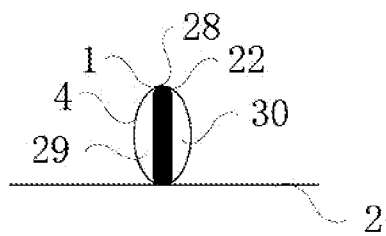

Structure 4 (see FIGS. 20a and 20b): Said shadow texture element 22 is in flat form, and the flat plane of said shadow texture element 22 is vertical or approximately vertical to the surface of the texture material 2. Longitudinal mid vertical plane of said shadow texture element 22 bends, and said longitudinal mid vertical plane is composed of midperpendicular lines, vertical to surface of the texture material 2, of each cross section of said shadow texture element 22. Said shadow texture element 22 is composed of three material sections extending, in parallel, along with length direction: shelter structure section 28, third transparent material section 29 and fourth transparent material section 30. Said shelter structure section 28 is located between said third transparent material section 29 and said fourth transparent material section 30. The cross section of said shelter structure section 28 is in rectangle or approximate rectangle, long side of said rectangle or approximate rectangle is vertical to the surface of the texture material 2.

The shadow texture element 22 with said Structure 4 is bended in order to guarantee the flat plane of the flat fiber being able to be vertical or approximately vertical to the surface of the texture material 2, and shadow characteristic of the Structure 4 is similar to that of the Structure 1.

Figure 20B:
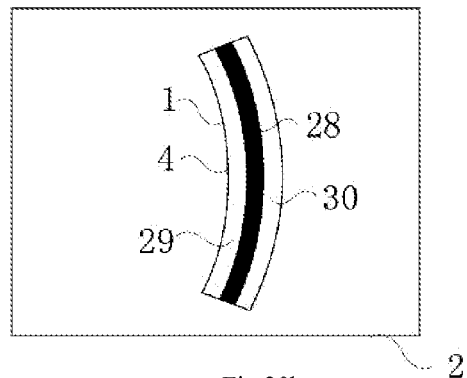

Random features S can collect coordinates of two end-points of the shelter structure section 28 in FIG. 20b.

Figure 21A:
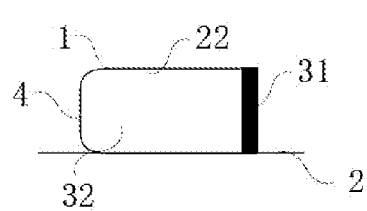

Structure 5 (see FIGS. 21a and 21b): Said shadow texture element 22 is in flat form, and flat plane of said shadow texture element 22 is parallel or approximately parallel to the surface of the texture material 2. Said shadow texture element 22 is composed of two material sections extending in parallel along with direction forward and backward, and distributed in left and right directions: fifth transparent material section 32 and shelter structure section 31. The cross section of said shelter structure section 31 is in rectangle form or approximate rectangle form, and long side of said rectangle or approximate rectangle is vertical to the surface of the texture material 2. The fifth transparent material section 32 is a transparent material with certain refractive index.

Figure 30A:
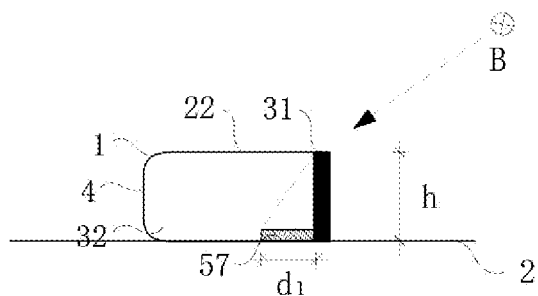
Figure 30B:
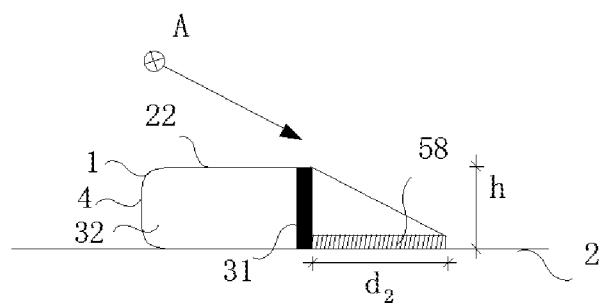
Figure 30C:
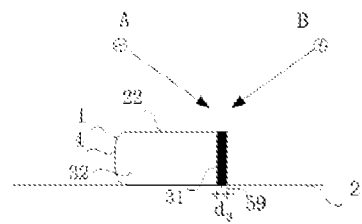

In FIG. 30a, about the shadow texture element 22 of said structure 5, when light source at B angle radiates said shadow texture element 22, light forms a shadow 57 of size $d_1$ via sheltering of the shelter structure section 31 and by refracting of said fifth transparent material section 32, as shown in the FIG. 30a. In FIG. 30b, when light source at A angle radiates said shadow texture element 22, light forms a shadow 58 of size $d_2$ via sheltering of the shelter structure section 31 but without any refracting. In FIG. 30c, when light sources at A angle and B angle simultaneously radiate said shadow texture element 22, width $d_3$ of a shadow 59 is equal to that of the shelter structure section 31, this shadow relationship formed by said shadow texture element 22 specially designed can not be formed by printed texture elements.

Figure 21B:
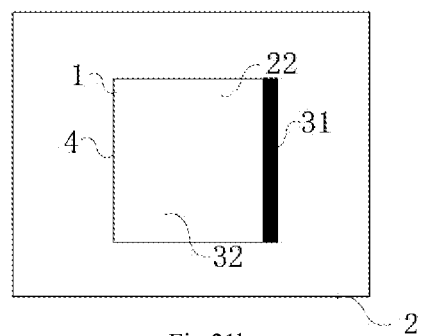

Random features S can collect two end-point's coordinates of the shelter structure section 31 in FIG. 21b.

Figure 22A:
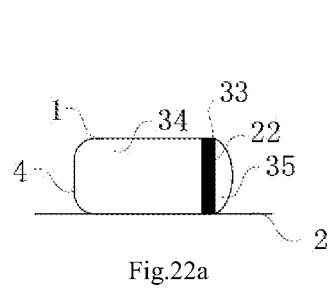
Figure 22B:
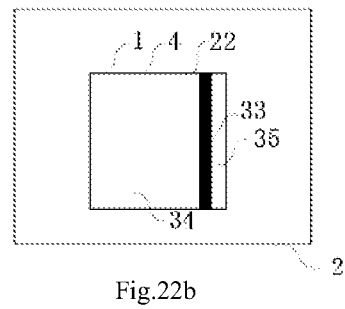

Structure 6 (see FIGS. 22a and 22b): Shadow texture element 22 is in flat form, and the flat plane of said shadow texture element 22 is parallel or approximately parallel to the surface of the texture material 2. The cross section of said shadow texture element 22 is distributed with three material sections: shelter structure section 33, sixth transparent material section 34 and seventh transparent material section 35. Said shelter structure section 33 is located between the sixth transparent material section 34 and the seventh transparent material section 35, and the shelter structure section 33 on the cross section of said shadow texture element 22 is in rectangular form or approximate rectangular form. Long side of said rectangle or approximate rectangle is vertical to the surface of said texture material 2. The sixth transparent material section 34 and the seventh transparent material section 35 are transparent materials with certain refractive indexes. The area size of the sixth transparent material section 34 on cross section of said shadow texture element 22 is over double in comparison with that of the seventh transparent material section 35.

Shadow feature of the shadow texture element 22 of said structure 6 is similar to that of the shadow texture element 22 of said structure 5. The function of increased seventh transparent material section 35 is to make the shadow texture element 22 of said structure 6 for more easily placing levelly onto the surface of the texture material 2.

Figure 23A:
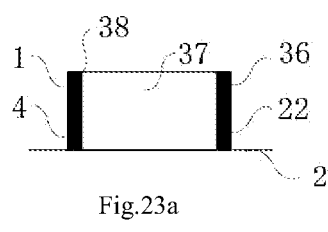

Structure 7 (see FIGS. 23a and 23b): Shadow texture element 22 is in flat form, and flat plane of said shadow texture element 22 is parallel or approximately parallel to the surface of the texture material 2. Said shadow texture element 22 is composed of three material sections extending in parallel along with direction forward and backward and distributed in left and right direction: first shelter structure section 38, eighth transparent material section 37 and second shelter structure section 36. Said first shelter structure section 38 and said second shelter structure section 36 are symmetrically distributed at left and right sides of said eighth transparent material section 37. The cross sections of said first shelter structure section 38 and said second shelter structure section 36 are both in rectangle form or approximately rectangle form, long side of said rectangle or approximate rectangle is vertical to surface of said texture material 2. Said first shelter structure section 38 and said second shelter structure section 36 have same sheltering characteristics, and said eighth transparent material section 37 is a transparent material with certain refractive index.

Shadow feature of the shadow texture element 22 of said structure 7 is similar to that of the shadow texture element 22 of said structure 5, arrangement of two sections of the first shelter structure section 38 and the second shelter structure section 36 is to eliminate possibility of imitating shadow texture elements 22 by printing.

Figure 23B:
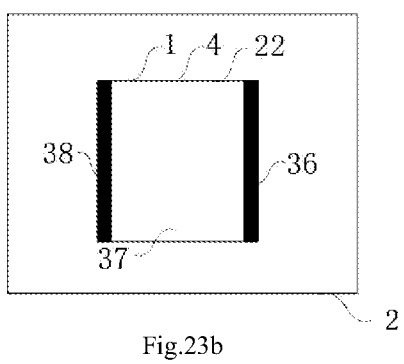

Random features S can collect two end-point's coordinates of any shelter structure part of the second shelter structure section 36 and the first shelter structure section 38 in the length direction in the FIG. 23b.

Figure 24A:
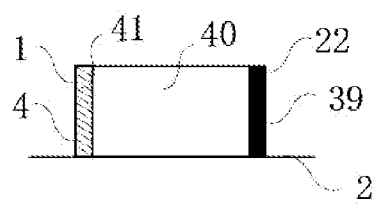

Structure 8 (see FIGS. 24a and 24b): Shadow texture element 22 is in flat form, and the flat plane of said shadow texture element 22 is parallel or approximately parallel to the surface of the texture material 2. Said shadow texture element 22 is composed of three material sections extending in parallel along with direction forward and backward and distributed in left and right direction: third shelter structure section 41, ninth transparent material section 40 and fourth shelter structure section 39. Said third shelter structure section 41 and fourth shelter structure section 39 are symmetrically distributed at left and right sides of said ninth transparent material section 40. The cross sections of said third shelter structure section 41 and said fourth shelter structure section 39 are both in rectangle form or approximately rectangle form, and long side of said rectangle or approximate rectangle is vertical to the surface of said texture material 2. Said third shelter structure section 41 and the fourth shelter structure section 39 have different sheltering characteristics, and said ninth transparent material section 40 is a transparent material with certain refractive index.

Shadow feature of the shadow texture element 22 with said structure 8 is similar to that of the shadow texture element 22 of said structure 7, but different material arrangement of the third shelter structure section 41 and the fourth shelter structure section 39 is for the purpose of further eliminating possibility of imitating shadow texture element in comparison with shadow texture element 22 of said structure 7.

Figure 24B:
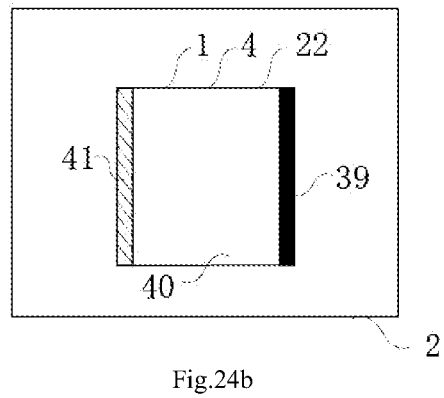

Random features S can collect two end-point's coordinates of any shelter structure part of the third shelter structure section 41 and the four shelter structure section 39 in the length direction in the FIG. 24b.

Figure 25A:
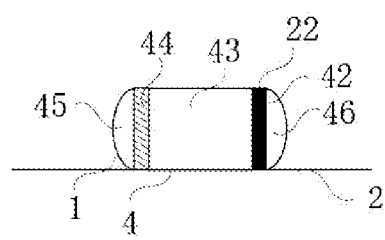
Figure 25B:
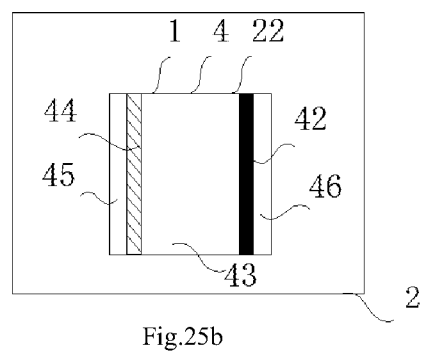

Structure 9 (see FIGS. 25a and 25b): Shadow texture element 22 is in flat form, and the flat plane of said shadow texture element 22 is parallel or approximately parallel to the surface of the texture material 2. Said shadow texture element 22 is composed of five material sections extending in parallel along with direction forward and backward and successively distributed in left and right direction: tenth transparent material section 45, fifth shelter structure section 44, eleventh transparent material section 43, sixth shelter structure section 42 and twelfth transparent material section 46. Area size of the eleventh transparent material section 43 on the cross section of said shadow texture element 22 is over double in comparison with that of the tenth transparent material section 45, and also is over double in comparison with that of the twelfth transparent material section 46. The cross sections of the fifth shelter structure section 44 and the sixth shelter structure section 42 are both in rectangular form or approximate rectangular form, and long side of said rectangle or approximate rectangle is vertical to the surface of the texture material 2. Said fifth shelter structure section 44 and the sixth shelter structure section 42 have different sheltering characteristics. Said tenth transparent material section 45, the eleventh transparent material section 43, and twelfth transparent material section 46 are transparent materials with certain refractive indexes.

Shadow feature of the shadow texture element 22 of said structure 9 is similar to that of the shadow texture element 22 of said structure 8. The function of increasing the tenth transparent material section 45 and the twelfth transparent material section 46 is to make the shadow texture element 22 of said structure 9 more easily place levelly onto the surface of the texture material 2.

Figure 26A:
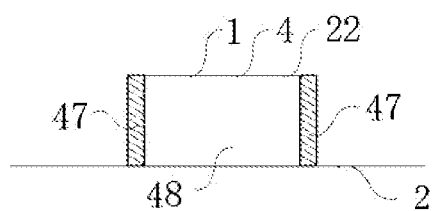
Figure 26B:
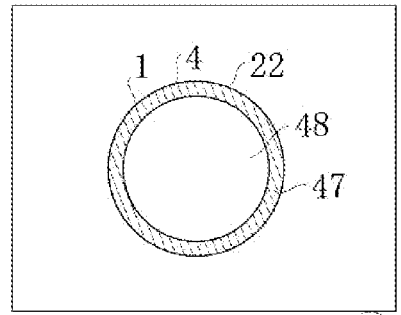
Figure 26C:
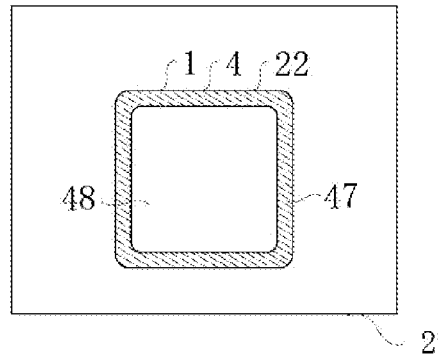
Figure 26D:
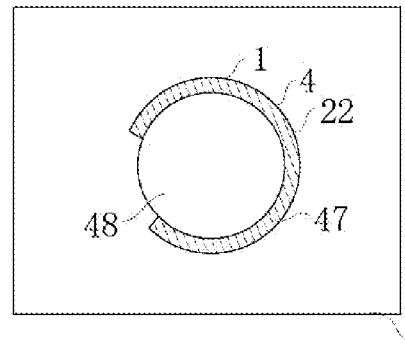

Structure 10: Shadow texture element 22 is in flat cylinder form. The cross section of said flat cylinder form is composed of two material sections: thirteenth transparent material section 48 located at central part and seventh shelter structure section 47 located at periphery. The seventh shelter structure section 47 on longitudinal section of said flat cylinder is at least one rectangle, and the long side of said rectangle is vertical to the surface of the texture material section 2. The thirteenth transparent material section 48 is a transparent material with certain refractive index. Where the flat cylinder can be one shown in FIGS. 26a, 26b and 26d, of which the seventh shelter structure section 47 at periphery of the flat cylinder in FIG. 26b is an unclosed ring. The flat cylinder can also be a flat prism as shown in FIG. 26c, especially a quadrangular prism; of course, it also can be other flat column.

Figure 27A:
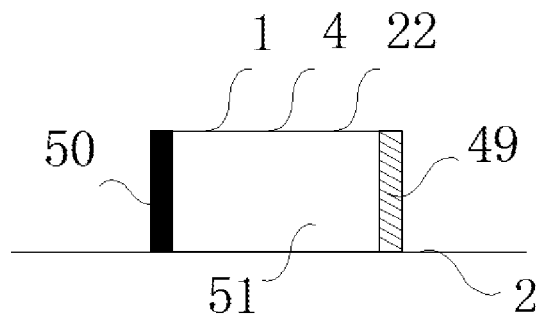

Structure 11 (see FIGS. 27a and 27b): Shadow texture element 22 is in flat cylinder form. The cross section of said flat cylinder is composed of three material sections: fourteenth transparent material section 51 located at central part, eighth shelter structure section 50 and ninth shelter structure section 49 which both located at same periphery and jointed with each other. The eighth shelter structure section 50 and the ninth shelter structure section 49 on longitudinal section of said flat cylinder form are both in rectangular form, and long sides of said rectangles are vertical to the surface of the texture material section 2. Said eighth shelter structure section 50 and said ninth shelter structure section 49 have different sheltering characteristics, and said fourteenth transparent material section 51 is a transparent material with certain refractive index.

Figure 27B:
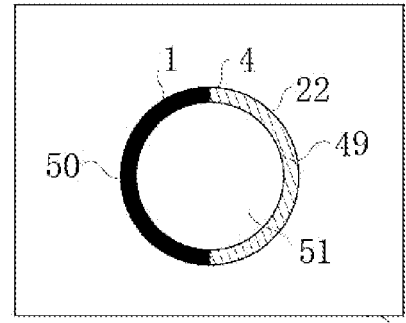

The eighth shelter structure section 50 and the ninth shelter structure section 49 of the shadow texture element 22 of said structure 11 are different in material but jointly form a closed ring as shown in FIG. 27b, and coordinates of their jointed points by these two sections are used as random features S.

Recognition model for shadow optical characteristics of ring shelter structures is easier.

For said shadow shelter structure, its material can be black shelter material and/or titanium dioxide powder shelter material and/or vacuum-coated membrane shelter material and/or color shelter material.

Material selection for said shelter structure has its own merits. Black-color shelter material can completely shelter each spectral waveband of radiating light source; titanium dioxide powder shelter material in white color can also completely shelter each spectral waveband of radiating light source; very thin shelter-layer of vacuum-coated membrane shelter material can completely shelter, for example, vacuum-coated Al-layer in 100 µm thickness can completely shelter to form a shadow, this is benefit to miniaturize the shadow texture element 22. Shadows formed by color shelter material can be in color.

Said recognition feature J is a different optical characteristic shown by the texture element 1, and the difference of said optical characteristic can be recognized by said recognition system.

Wherein, difference of optical characteristics of said texture element 1 is formed via setting different radiating angles to radiate said texture element 1.

Wherein, said optical characteristic is a geometric optical characteristic. Said geometric optical characteristic refers to optical characteristic formed by particle nature of wave under radiating of light source.

Wherein, said optical characteristic is a shadow formed by the texture element 1 irradiated by the light source. Said shadow formation is caused by sheltering, and this sheltering can be spectrum or intensity partly sheltered, if only the recognition system can recognize difference between sheltered and unsheltered, for example, sheltering amount is 70% of incident light intensity, and for example, sheltering part band in incident light spectroscopy.

Wherein, said optical characteristic is a spectrum characteristic.

Furthermore, said spectrum characteristic is a color spectrum characteristic appeared by the texture element 1 under said condition of reflecting light; or/and said spectrum characteristic is a spectrum characteristic emerged by emission light of the texture element 1 under condition of exciting light.

Wherein, optical characteristic of said texture element 1 is a spectrum characteristic and/or an interference light pattern appeared by the texture element 1 under interference condition, such as selecting crystal with obvious interference effects, or selecting grain with Newton's rings interference characteristic and etc.; or a spectrum characteristic and/or a diffraction light pattern appeared under diffraction condition; or optical characteristic of said texture element 1 is a spectrum characteristic and/or a polarized light pattern appeared by the texture element 1 under polarization condition; or optical characteristic of said texture element 1 is a spectrum characteristic and/or a dispersion light pattern appeared by the texture element 1 under dispersion condition; or optical characteristic difference of said texture element 1 is formed via changed spectrum characteristic of radiating light source; or optical characteristic difference of said texture element 1 is formed via changed intensity of radiating light source; or optical characteristic difference of said texture element 1 is formed via full reflection produced by said texture element 1 under radiating of a light source from at least one angle.

Wherein, said optical characteristic is light intensity.

Figure 31A:
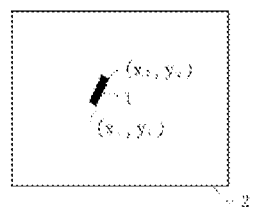
FIGS. 31a, 31b and 32 are drawings of the random features S of the texture elements 1.
Figure 31B:
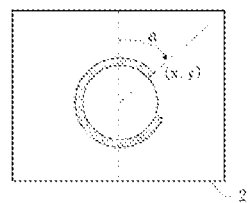
Figure 32:
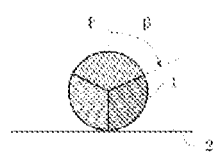

As shown in FIGS. 31a, 31b, and 32, said random features S are position of the texture element 1 and/or orientation of the surface, parallel to the surface of the texture material 2, of the texture element 1 and/or rotation orientation of the surface, vertical to the surface of the texture material 2, of texture element 1 and/or spectrum characteristic of the texture element 1 and/or geometric form of the texture element 1 and/or geometric size of the texture element 1.

If more random features S are collected on one texture element 1, and the texture is smaller, and the random features are collected in higher accuracy, thus the faker shall pay higher costs on placing the random features S for single texture element 1. A random feature S with rotation orientation as shown in FIG. 32 is very difficult to place.

Figure 33:
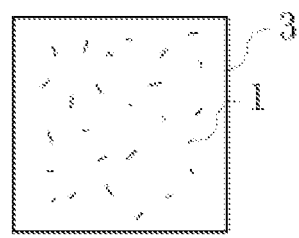
FIG. 33 is a drawing of the texture elements 1 in the anti-counterfeit identification 3.

As shown in FIG. 33, quantity of the texture element 1 in the anti-counterfeit identification 3 is more than N.

The purpose of such design is that: because distribution of texture elements is random, sampling area may be in blank, or there is only one texture element 1 or two texture elements 1 or a few of texture elements 1, such distribution situation is possible, but the probability of these occurrence may be different. Endangerment of fewer amounts of texture elements 1 is not higher in costs for a faker when he adopts artificial placement in his counterfeit, which will influence anti-counterfeit effects. For example, in the case of only one texture element 1 appeared, a faker can cheat the recognition system only by placing one texture element 1, and such faked anti-counterfeit identification with only one texture element 1 can be copied in large amount. Therefore, these anti-counterfeit identifications with a few of texture elements 1 shall be rejected (For example, not less than 20 texture elements 1 shall be on anti-counterfeit identification, minimum limit of N is an economic problem; for anti-counterfeit product with higher added value, N value shall be more; for one with lower added value, N value could be less.).

Storage way of said random features S is, after encrypting, to convert the random features S into code and to print the code onto the anti-counterfeit identification 3.

The purpose of such design is that: the code (such as two-dimensional code) contains information of random features S of the texture elements 1 and various basic information, encrypting code, private-key and etc.; said two-dimensional code itself has certain storage capability, and the information of random features S is stored directly on the two-dimensional code of the anti-counterfeit identification. The merit of this design is that the recognition system does not need to extract data from database when recognizing, but potential problems are that faker can forge in batch if the encrypting method is revealed or deciphered by fakers, and the preparation costs for each anti-counterfeit identification are higher, the recognizers are also higher in costs.

Storage way of said random features S is to save the random features S to the database.

Furthermore, storage way of random features S is to directly store random features S distributed on anti-counterfeit identification 3 into the database. The purpose of this design is that because there can easily be over than $10^{20}$ combinations for random features S distributed in texture elements 1, its repeat probability can be ignored; even if a few of repeats are formed in practice process, for example, a part per hundred million of repeat probability, which is unvalued for a faker to use. Its merit are that code is unnecessary to be printed onto anti-counterfeit identification, thus preparation costs of anti-counterfeit identification are reduced, and volume and costs for the recognizer is also decreased, simultaneously it eliminates wrong judgment caused by incorrectly reading the code.

Furthermore, storage way of random features S is to number anti-counterfeit identification 3 and to print said number onto the anti-counterfeit identification 3, to store the number and random features S of corresponded anti-counterfeit identification 3 into the database.

Storage way of said random features S is, after encrypting process, to convert said random features S into code and to print the code onto the anti-counterfeit identification 3, and simultaneously to store the random features S into the database. The purpose of this design is to make whole set of the recognition system more reliable.

Figure 34:
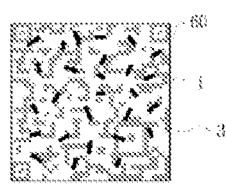
FIG. 34-FIG. 37 are drawings of various anti-counterfeit identifications 3.

As shown in FIG. 34, said code or number is overprinted within collection area of the texture elements 1 in the anti-counterfeit identification 3, said collection area is a distribution area of the texture elements 1 which are extracted from the texture material 2 and stored in the recognition system. The purposes of this design are to reduce area size of anti-counterfeit identification and to largely simplify the recognizer, especially reduce size of the recognizer, which makes possibility to combine a recognition system and a mobile phone into one.

Furthermore, for the same excitation light sources, two-dimensional code printing ink and texture elements 1 with obvious difference in spectrum characteristic of emission light are selected for the difference able to be distinguished by the recognizer. For example, the texture element 1 is a fiber contained with color spectrum of fluorescence red, fluorescence blue or fluorescence yellow under same excitation light source, and two-dimensional code is printed by using fluorescence IR color ink of the same excitation light source, so the recognition system can distinguish differences of these color spectrums.

Furthermore, for different excitation light sources, two-dimensional code printing ink and texture element 1 composed of luminous material with different exciting light spectrum are selected. For example, the texture element 1 contains a luminous material with 365 μm exciting light spectrum, and the two-dimensional code printing ink is a luminous material excited by another exciting light spectrum.

Figure 35:
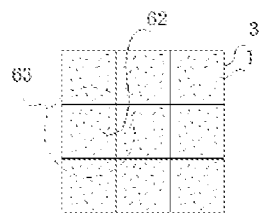

As shown in FIG. 35, a collection area of said anti-counterfeit identification 3 includes several collection sub-areas 62, when recognizing, the recognition system only picks up any one of collection sub-areas 62. Said collection area is a distribution area of the texture elements 1 extracted from the texture material 2 and stored in the recognition system.

Figure 37:
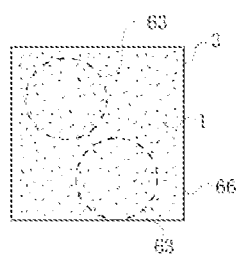

As shown in FIG. 37, when recognizing, the recognition system extracts any part of the collection area. Said collection area is a distribution area of the texture elements 1 extracted from the texture material 2 and stored in the recognition system.

The purpose of this design is to largely reduce size of the recognizer, especially in the case of counterfeited product with very high profits. Because it is random for identifier to select an area from several areas in his recognizing, the faker must counterfeit all of these areas, thus costs of the recognizer will not be changed with further enlarged collection area.

Furthermore, when recognizing, identifier is only required to place collection area 63 of the recognizer within the whole of the anti-counterfeit identification area, it is easier at will.

Figure 36:
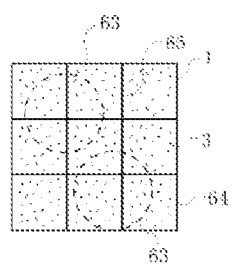

As shown in FIG. 36, position-marking lines 65 are printed on the collection area of said anti-counterfeit identification 3.

Position-marking lines 65 in the anti-counterfeit identification 3 can accelerate guiding of comparison of random features S', in order to reduce memory space in the database.

For random features S in collection area on said anti-counterfeit identification 3, random features S of partial texture elements 1 within collection area are extracted and stored. The purpose of this design is that because a faker is impossible to know which texture elements 1 are selected randomly and partially by the recognizer, the faker must completely and accurately copy random features S of all texture elements 1. Texture elements 1 only partly selected can reduce memory space and decrease duration in calculation process, especially when two-dimensional code manner is adopted for storing random features S.

Furthermore, when recognizing, random features S' of partial texture elements 1 are selected within sampling area of the recognizer for comparing with the stored random features S. The purpose of this design is that because information is asymmetric, a faker is impossible to know which parts of partial texture elements 1 within collection area are selected, it is impossible for him to artificially place a few texture elements 1, but whole of them must be placed.

Furthermore, when there are several random features S for each texture element 1, and when storing and recognizing, it is only to compare partial random features S selected randomly. For example, when said texture element 1 is a optical-angle color-changing fiber, coordinates of one dot are selected on one fiber, for example, one of two end points of the fiber, middle point of the fiber, any point with one fiber length distance to one end point. Though only one dot coordinates are taken, a large amount of memory space is saved. Because a faker does not know which dot of the fiber is selected, he must accurately place position, shape and orientation of the whole fiber.

Furthermore, fault tolerance is set for comparing said random texture features, for example, comparing 100 random features S', if 60% of them satisfy to the requirement, they can be considered as being valid. The purpose of this design is that when surface of anti-counterfeit identification is polluted and abraded, and when the recognizer only extracts random features S' information of partial texture elements 1' within sampling area during recognizing, judgment is still effective, simultaneously it does not low copy threshold to a faker.

Said recognition system contains a recognizer and a storage database, said recognizer, after shooting images, directly transmits them to the storage database, extraction of random features S' to be recognized is performed in the storage database.

Thus this recognizer will be simplified further, when texture elements 1 change, it will easily get with on the premise of the recognizer not being alternated.

Said recognition system contains a recognizer and a storage database, said recognizer, after shooting images, directly transmits them to the storage database, comparison of feature J' and the recognition feature J is performed in the storage database.

Thus this recognizer will be simplified further, when texture elements 1 change, it will easily get with on the premise of the recognizer not being alternated.

Geometric size of said texture element 1 is not more than 150 μm. Said geometric size of the texture element 1 is the size in length direction, especially in maximum length scale direction.

Figure 38:
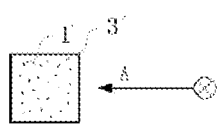
FIG. 38-FIG. 41 are drawings of are drawings of recognizers.

As shown in FIG. 38, said recognizer contains one radiating light source, radiating direction of said radiating light source is randomly set in the recognizer. Recognition features J stored in said recognition system contain optical characteristics of the texture element 1 radiated by light source from each direction.

For example, a radiating light source with one angle is only equipped in the recognizer, but in the recognizer offered to identifier, radiating angle of single light source has many types, thus light source radiating angles of the recognizer held by different identifiers also have several possibilities, for example, there are 36 types, that is, radiating angle of light source in the recognizer to a faker is random, and simultaneously when identifier performs recognizing, position of anti-counterfeit identification relative to the recognizer may also be random. A faker is impossible to pre-cognize, therefore there is less probability for a faker to imitate optical characteristic of certain angle texture elements 1 by using printed texture elements and not to be found by the recognizer, this design can further simplify the recognizer, and image process is also much easier.

Figure 39:

As shown in FIG. 39, in said recognizer there are two radiating light sources, and said two radiating light sources are in different radiating angles, recognition features J stored in said recognition system contain optical characteristics of texture element 1 radiated by light source from each direction.

Figure 40:
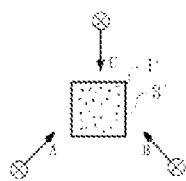

As shown in FIG. 40, in said recognizer there are three radiating light sources, said three radiating light sources are in different radiating angles, and recognition features J stored in said recognition system contain optical characteristics of texture element 1 radiated by light source from each direction.

Figure 41:
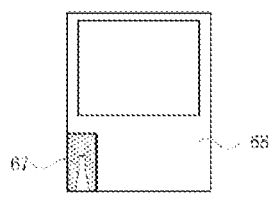

As shown in FIG. 41, said recognizer is set in a mobile phone and combined with a mobile phone as one set.

Said recognizer is in a manner of voice reply.

Taking fluorescent optical-angle color-changing texture element 6 as a sample (see FIGS. 2-10); an anti-counterfeit method of random textures offered in this invention includes steps as follow:
A. Selecting texture material 2 distributed randomly with fluorescent optical-angle color-changing texture elements 6;
B. Storing inherent recognition features J of the fluorescent optical-angle color-changing texture elements 6 into a recognition system, its inherent recognition features J are different spectrum characteristic appeared respectively when excitation light source radiates said fluorescent optical-angle color-changing texture elements 6 from different set angles A and B;
C. Random features S distributed in said fluorescent optical-angle color-changing texture elements 6 are extracted and stored in the recognition system, to make the texture material 2 to be an anti-counterfeit identification 3. Random features S distributed in the fluorescent optical-angle color-changing texture elements 6 are coordinates of two end-points of the fluorescent optical-angle color-changing texture elements 6, especially when said fluorescent optical-angle color-changing texture elements 6 are the structures shown in FIGS. 7-9, said random features S also include rotation orientation of cross section of the fiber besides two-end point coordinates of the fluorescent optical-angle color-changing texture elements 6 (see FIG. 33). Collection area can be a square grid, that is, one large square grid is printed on texture material 2, and position-marking lines dividing the large grid into several small grids, see FIG. 36; Size of sampling area 63 of the recognizer is far smaller than that of large grid;
D. During recognizing, the recognition system extracts features J' and random features S' of texture elements 1' to be recognized on anti-counterfeit identification 3' to be recognized, and respectively compares the features J' and the recognition features J as well as the random features S' and the random features S; if one or two of the compared results does not match, anti-counterfeit identification 3' to be recognized is judged not to be said anti-counterfeit identification 3; if both compared results are consistent, anti-counterfeit identification 3' to be recognized is judged to be said anti-counterfeit identification 3. When recognizing in practice, if the anti-counterfeit identification 3' to be recognized is judged as being said anti-counterfeit identification 3, user shall be informed that the product with this anti-counterfeit identification 3' is a genuine product; if the anti-counterfeit identification 3' to be recognized is judged as not being said anti-counterfeit identification 3, user shall be informed that the product with this anti-counterfeit identification 3' is a counterfeit.

A flow chart of recognition in practice is shown in FIG. 1.

Taking interference membrane texture element 12 as a sample (see FIGS. 11 and 12), this invention provides an anti-counterfeit method for random texture includes steps as follows:

Wherein, the steps included are almost the same as those of random texture anti-counterfeit method for the above-mentioned fluorescent optical-angle color-changing texture elements 6, but the differences are: said interference membrane texture element 12 is in sheet form (see FIG. 11), recognition feature J is that there is a multi-layer interference membrane 14 with two color-changing types simultaneously distributed on said texture material 2, for example, when said sheet form is square, if light source A, at a direction vertical to the surface of the texture material 2, radiates said interference membrane texture element 12, red color appears, if light source B, at a direction inclined to the surface of the texture material 2, radiates said interference membrane texture element 12, blue color appears; when said sheet form is triangle, if light source A, at a direction vertical to the surface of the texture material 2, radiates said interference membrane texture element 12, yellow color appears, if light source B, at a direction inclined to the surface of the texture material 2, radiates said interference membrane texture element 12, blue color appears.

When the interference membrane texture element 12 is in triangular sheet form, its distributed random features S are any two apexes of the triangle; when the interference membrane texture element 12 is in square form, its distributed random features S are two end-points at diagonal line of the square.

Taking shadow texture element 22 as a sample (see FIGS. 17a-27b, and FIGS. 28a-30c), this invention provides a random texture anti-counterfeit method includes steps as follows:

Wherein, the steps included are almost the same as those of random texture anti-counterfeit method for said fluorescent optical-angle color-changing texture element 6, but the differences are: recognition feature J of the shadow texture element 22 is: to shoot three photos of shadow images, first shadow image appears when light source radiates said shadow texture element 22 from direction A, second shadow image appears when light source radiates said shadow texture element 22 from direction B, third shadow image appears when light source radiates said shadow texture element 22 simultaneously from directions A and B, the difference of these shadow images forms the recognition feature J; random features S of the shadow texture element 22 have been explained above in details.

The invention claimed is:
1. An anti-counterfeit method of random texture that includes following steps:

A. Selecting texture material distributed randomly with texture elements;
B. Storing inherent recognition features J of texture elements into a recognition system;
C. Extracting random features S of distribution of texture elements and storing them into the recognition system to make the texture material to be an anti-counterfeit identification;
D. In recognizing, the recognition system extracts features J' and random features S' of texture elements to be recognized on the anti-counterfeit identification to be recognized, respectively compares the features J' and the inherent recognition features J as well as the random features S' and the random features S; if one or two of the compared results does not match, anti-counterfeit identification to be recognized is judged not to be said anti-counterfeit identification; if both of two compared results match, anti-counterfeit identification to be recognized is judged to be said anti-counterfeit identification;
said inherent recognition features J is a feature having difference of characteristics, wherein said feature having difference of characteristics means that said texture element shows different characteristics when radiating said texture element from different radiating angles, said difference of characteristics comprises difference of optical characteristics and/or difference of spectrum characteristics and/or difference of shadows and said difference of characteristics can be recognized by said recognition system.

2. An anti-counterfeit method of random texture as said in the claim 1, wherein said texture element is a texture element with inherent recognition features J that cannot be imitated by a printed texture element.

3. An anti-counterfeit method of random texture as said in the claim 1, wherein said texture element is a texture element with inherent recognition features J that cannot be imitated by a printed texture element under said recognition system condition.

4. An anti-counterfeit method of random texture as said in any of the claim 1, wherein said texture element is an optical-angle changing texture element; when light source radiates the optical-angle changing texture element from different set radiating angles, the optical-angle changing texture element shows different optical characteristics, and the difference of said optical characteristics can be recognized by said recognition system.

5. An anti-counterfeit method of random texture as said in the claim 1, wherein said texture element is an optical-angle color-changing texture element; when light source radiates the optical-angle color-changing texture element from different set radiating angles, the optical-angle color-changing texture element shows different spectrum characteristics, and the difference of said spectrum characteristics can be recognized by said recognition system.

6. An anti-counterfeit method of random texture as said in the claim 1, wherein said texture element is a fluorescent optical-angle color-changing texture element; when excitation light source radiates the fluorescent optical-angle color-changing texture element from different set radiating angles, the fluorescent optical-angle color-changing texture element shows different spectrum characteristics, and the difference of said spectrum characteristics can be recognized by the said recognition system.

7. An anti-counterfeit method of random texture as said in the claim 6, wherein said fluorescent optical-angle color-changing texture element is a fiber, and cross section of said fiber is composed of two material sections: first luminous material section and blocking material section; the blocking material section is a blocking material able to obstruct exciting light of the first luminous material section, and said fiber includes following structures:

Structure 1: Longitudinal mid vertical plane of said fiber is bended, and said longitudinal mid vertical plane is composed of midperpendicular lines of each cross section of said fiber; said cross section of the fiber is in circular form; the first luminous material section is located at one side of said longitudinal mid vertical plane; or Structure 2: Said fiber is in flat form; longitudinal mid vertical plane of said fiber is bended, and said longitudinal mid vertical plane is composed of short-axis midperpendicular lines of each cross section of said fiber; said first luminous material section is located at one side of said longitudinal mid vertical plane; or Structure 3: Said fiber is a straight fiber in flat form, and the first luminous material section is located at one side of said longitudinal mid vertical plane, and said longitudinal mid vertical plane is composed of short-axis midperpendicular lines of each cross section of said fiber; or said fluorescent optical-angle color-changing texture element is a bended fiber; cross section of said fiber is in circular form, and said cross section is composed of two material sections: first luminous material section and second luminous material section, wherein the first luminous material section and the second luminous material section show different spectrum characteristics in emission lights; longitudinal mid vertical plane of said fiber is bended, and said longitudinal mid vertical plane is composed of midperpendicular lines of each cross section of said fiber; said first luminous material section and said second luminous material section are symmetrically located at two sides of the longitudinal mid vertical plane; or said fluorescent optical-angle color-changing texture element is a fiber, and the cross section of said fiber is composed of three material sections: first luminous material section, blocking material section and second luminous material section; emission lights of the first luminous material section and the second luminous material section show different spectrum characteristics; the blocking material section is a blocking material able to obstruct exciting lights of the first luminous material section and the second luminous material section; the blocking material section is located between the first luminous material section and the second luminous material section; said fiber includes following structures:

Structure 4: Longitudinal mid vertical plane of said fiber is bended, and said longitudinal mid vertical plane is composed of midperpendicular lines of each cross section of said fiber, and cross section of said fiber is in circular form; the first luminous material section and the second luminous material section are symmetrically located at two sides of the longitudinal mid vertical plane, or Structure 5: Said fiber is in flat form; longitudinal mid vertical plane of said fiber is bended, and said longitudinal mid vertical plane is composed of short-axis midperpendicular lines of each cross section of said fiber; the first luminous material section and the second luminous material section are symmetrically located at two sides of the longitudinal mid vertical plane, or Structure 6: Said fiber is a straight fiber in flat form; the first luminous material section and the second luminous material section are symmetrically located at two sides of the longitudinal mid vertical plane, and said longitudinal mid vertical plane is composed of short-axis mid-perpendicular lines of each cross section of said fiber; or said fluorescent optical-angle color-changing texture element is a fiber, and said fluorescent optical-angle color-changing texture element is at least composed of three material sections distributed on cross section of said fiber and extending along with length direction of the fiber: first luminous material section, second luminous material section and third luminous material section; emission lights of said at least three material sections show different spectrum characteristics of emission lights; geometric distribution of said at least three material sections specially designed can make said fiber have at least two different radiating angles of exciting light, when radiating said fluorescent optical-angle color-changing texture element, different spectrum characteristics appear, and said fiber includes following structures:

Structure 7: Cross section of said fiber is in circular form; first luminous material section, second luminous material section and third luminous material section with different spectrum characteristics of emission lights are distributed on said cross section, and said three luminous material sections are adjacent with each other in fan-shaped form; or Structure 8: Cross section of said fiber is in circular form; first luminous material section, second luminous material section, third luminous material section with different spectrum characteristics of emission lights and a blocking material section are distributed on said cross section, and said blocking material section is located among said three luminous material sections; or Structure 9: Cross section of said fiber is in circular form; first luminous material section, second luminous material section, third luminous material section and fourth luminous material section with different spectrum characteristics of emission lights are distributed on said cross section, and said four luminous material sections are adjacent with each other in fan-shaped form; or fluorescent optical-angle color-changing texture elements are distributed on said texture material; at least first luminous material section and the blocking material section are distributed on cross section of said fluorescent optical-angle color-changing texture element; structure of said fluorescent optical-angle color-changing texture element is designed to guarantee the blocking material section able to prevent the exciting light from radiating onto the first luminous material section when the exciting light radiates vertically onto the surface of the texture material, and to make the exciting light radiate onto the first luminous material section when the exciting light, at a slant or in parallel, radiates onto the surface of the texture material.

8. An anti-counterfeit method of random texture as said in the claim 1, wherein said texture element is an interference membrane texture element containing multi-layer interference membrane, and there are at least two different radiating angles; when radiating the interference membrane texture element, it will appear different emission light spectrum characteristics, and the difference of said spectrum characteristics can be recognized by said recognition system, and said interference membrane texture element includes following structures:

Structure 1: The interference membrane texture element is in sheet form, wherein said multi-layer interference membrane is parallel to the surface of the texture material; or Structure 2: The interference membrane texture element is composed of two sections: said multi-layer interference membrane and a carrier; the multi-layer interference membrane is vertical to the surface of the texture material; the carrier supports the multi-layer interference membrane to be vertical to the surface of the texture material.

9. An anti-counterfeit method of random texture as said in the claim 1, wherein said texture element is a color optical-angle color-changing texture element, and when light source from different radiating angles radiates said color optical-angle color-changing texture element, it appears different spectrum characteristics of reflective light, and the difference of said spectrum characteristic can be recognized by said recognition system; said color optical-angle color-changing texture element is a fiber, and it includes following structures:

Structure 1: Longitudinal mid vertical plane of said fiber is bended, and said longitudinal mid vertical plane is composed of midperpendicular lines of each cross section of said fiber; the cross section of said fiber is in circular form, and said cross section of said fiber is composed of two material sections: a separating material section and first color material section; the separating material section can obstruct radiating light, and the first color material section is located at one side of the longitudinal mid vertical plane; or Structure 2: Said fiber is in flat form; longitudinal mid vertical plane of said fiber is bended, and said longitudinal mid vertical plane is composed of midperpendicular lines of each cross section of said fiber; the said cross section of said fiber is composed two material sections: a separating material section and first color material section; the separating material section can obstruct radiating light, and the first color material section is located at one side of the longitudinal mid vertical plane; or Structure 3: Said fiber is a straight fiber in flat form; the cross section of said fiber is composed two material sections: a separating material section and first color material section; the separating material section can obstruct radiating light, and the first color material section is located at one side of the longitudinal mid vertical plane; or Structure 4: Longitudinal mid vertical plane of said fiber is bended, and said longitudinal mid vertical plane is composed of midperpendicular lines of each cross section of said fiber; the cross section of said fiber is in circular form, and said cross section is composed three material sections: first color material section, second color material section and a separating material section; the first color material section and the second color material section appear different spectrum characteristics, and the separating material section can obstruct radiating light; the separating material section is located between the first color material section and the second color material section, and the first color material section and the second color material section are located at two sides of the longitudinal mid vertical plane; or Structure 5: Said fiber is in flat form; longitudinal mid vertical plane of said fiber is bended, and said mid vertical plane is composed of midperpendicular lines of each cross section of said fiber; the cross section of said fiber is composed three material sections: first color material section, second color material section and a separating material section; the first color material section and the second color material section appear different spectrum characteristics, and the separating material section can obstruct radiating light; the separating material section is located between the first color material section and the second color material section, and the first color material section and the second color material section are located at two sides of the longitudinal mid vertical plane; or Structure 6: Said fiber is a straight fiber in flat form, and the cross section of said fiber is composed three material sections: first color material section, second color material section and a separating material section; the first color material section and the second color material section appear different spectrum characteristics, and the separating material section can obstruct radiating light; the separating material section is located between the first color material section and the second color material section, and the first color material section and the second color material section are located at two sides of the longitudinal mid vertical plane; or Structure 7: Cross section of said fiber is at least distributed with first color material section, second color material section and third color material section, and said at least three color material sections appear different spectrum characteristics; geometric distribution of said at least three material sections is specially designed to make said fiber have at least two different radiation angles existed for radiating light, when radiating said fiber, its reflective lights can show different spectrum characteristics; said fiber includes following structures:

Structure 7-1: Cross section of said fiber is in circular form; on said fiber's cross section there are distributed with first color material section, second color material section and third color material section with different spectrum characteristics of reflective light, and a separating material section, wherein the separating material section is distributed among said three color material sections; or Structure 7-2: Cross section of said fiber is in circular form; on said fiber's cross section there are distributed with first color material section, second color material section, third color material section and fourth color material section with different spectrum characteristics of reflective light, and a separating material section, wherein the separating material section is located among said four color material sections.

10. An anti-counterfeit method of random texture as said in the claim 1, wherein said texture element is a shadow texture element, and said shadow texture element includes shelter structure for forming shadow, when radiating said shadow texture element from different set radiation angles, said shelter structure can form different shadows, and the difference of said shadows can be recognized by said recognition system.

11. An anti-counterfeit method of random texture as said in the claim 10, wherein said shadow texture element includes following structures:

Structure 1: The shadow texture element is a long-strip texture element, and the cross section of said long-strip texture element is in rectangular form, and the long side of said rectangular form is vertical to the surface of the texture material; longitudinal mid vertical plane of said shadow texture element is bended, and said longitudinal mid vertical plane is composed of midperpendicular lines of each cross section of said shadow texture element, which are vertical to the surface of the texture material; or Structure 2: The shadow texture element is a sphere texture element; or Structure 3: The shadow texture element is in flat form, and the flat plane of said shadow texture element is parallel or approximately parallel to the surface of the texture material; said shadow texture element is composed of three material sections in parallel extending along with the length direction: a shelter structure section, first transparent material section and second transparent material section; said shelter structure section is located between said first transparent material section and said second transparent material section; cross section of said shelter structure section is in rectangular form or approximately in rectangular form, and the long side of said rectangular form or approximate rectangular form is vertical to the surface of the texture material; refractive indexes of said first transparent material section and said second transparent material section are different; or Structure 4: Said shadow texture element is in flat form, and the flat surface of said shadow texture element is vertical or approximately vertical to the surface of the texture material; the longitudinal mid vertical plane of said shadow texture element is bended, and said longitudinal mid vertical plane is composed of midperpendicular lines of each cross section of said shadow texture element, and the midperpendicular lines are vertical to the surface of the texture material; said shadow texture element is composed of three material sections extending in parallel along with length direction: shelter structure section, third transparent material section and fourth transparent material section; said shelter structure section is located between said third transparent material section and said fourth transparent material section; cross section of said shelter structure section is in rectangular form or in approximate rectangular form, and the long side of said rectangular form or approximate rectangular form is vertical to the surface of the texture material; or Structure 5: Said shadow texture element is in flat form, and the flat surface of said shadow texture element is parallel or approximately parallel to the surface of the texture material; said shadow texture element is composed of two material sections extending in parallel along with direction forward and backward, and distributed in left and right directions: fifth transparent material section, and shelter structure section; cross section of said shelter structure section is in rectangular form or in approximate rectangular form, and the long side of said rectangular form or approximate rectangular form is vertical to the surface of the texture material; the fifth transparent material section is a transparent material with certain refractive index; or Structure 6: The shadow texture element is in flat form, and the flat surface of said shadow texture element is parallel or approximately parallel to the surface of the texture material; on cross section of said shadow texture element, three material sections are distributed: shelter structure section, sixth transparent material section and seventh transparent material section; said shelter structure section is located between the sixth transparent material section and the seventh transparent material section; the shelter structure section on cross section of said shadow texture element is in rectangular form or in approximate rectangular form, and the long side of said rectangular form or approximate rectangular form is vertical to the surface of the texture material; the sixth transparent material section and the seventh transparent material section are transparent materials with certain refractive indexes; area size of the sixth transparent material section on cross section of said shadow texture element is over double in comparison with that of the seventh transparent material section; or Structure 7: The shadow texture element is in flat form, and the flat surface of said shadow texture element is parallel or approximately parallel to the surface of the texture material; said shadow texture element is composed of three material sections extending in parallel along with direction forward and backward, and distributed in left and right directions: first shelter structure section, eighth transparent material section and second shelter structure section; said first shelter structure section and said second shelter structure section are symmetrically distributed at left side and right side of said eighth transparent material section; cross sections of said first shelter structure section and the second shelter structure section are in rectangular form or in approximate rectangular form, and the long side of said rectangular form or approximate rectangular form is vertical to the surface of the texture material; said first shelter structure section and the second shelter structure section have the same light-sheltering characteristics, said eighth transparent material section is a transparent material with certain refractive index; or Structure 8: The shadow texture element is in flat form, and the flat surface of said shadow texture element is parallel or approximately parallel to the surface of the texture material; said shadow texture element is composed of three material sections extending in parallel along with direction forward and backward, and distributed in left and right directions: third shelter structure section, ninth transparent material section and fourth shelter structure section; said third shelter structure section and said fourth shelter structure section are symmetrically distributed at left side and right side of said ninth transparent material section; cross sections of said third shelter structure section and the fourth shelter structure section are in rectangular form or in approximate rectangular form, and the long side of said rectangular form or approximate rectangular form is vertical to the surface of the texture material; said third shelter structure section and the fourth shelter structure section have different light-sheltering characteristics, and said ninth transparent material section is a transparent material with certain refractive index; or Structure 9: The shadow texture element is in flat form, and the flat surface of said shadow texture element is parallel or approximately parallel to the surface of the texture material; said shadow texture element is composed of five material sections extending in parallel along with direction forward and backward and successively distributed in left and right directions: tenth transparent material section, fifth shelter structure section, eleventh transparent material section, sixth shelter structure section and twelfth transparent material section; area size of the eleventh transparent material section on cross section of said shadow texture element is over double in comparison with that of the tenth transparent material section, and area size of the eleventh transparent material section on cross section of said shadow texture element is over double in comparison with that of the twelfth transparent material section; cross sections of said fifth shelter structure section and the sixth shelter structure section are both in rectangular form or in approximate rectangular form, and the long side of said rectangular form or approximate rectangular form is vertical to the surface of the texture material; said fifth shelter structure section and the sixth shelter structure section have different light-sheltering characteristics, and said tenth transparent material section, the eleventh transparent material section and the twelfth transparent material section are transparent materials with certain refractive indexes; or Structure 10: The shadow texture element is in flat cylinder form, and cross section of said flat cylinder form is composed of two material sections: thirteenth transparent material section located at central part and seventh shelter structure section located at periphery; the seventh shelter structure section on longitudinal section of said flat cylinder form has at least one rectangular form, and the long side of said rectangular form is vertical to the surface of the texture material section; the thirteenth transparent material section is a transparent material with certain refractive index; or Structure 11: The shadow texture element is in flat cylinder form, and the cross section of said flat cylinder form is composed of three material sections: fourteenth transparent material section located at central part, as well as eighth shelter structure section and ninth shelter structure section located at same periphery and jointed with each other; the eighth shelter structure section and the ninth shelter structure section on longitudinal section of said flat cylinder form are both in rectangular form, and the long side of said rectangular form is vertical to the surface of the texture material section; said eighth shelter structure section and the ninth shelter structure section have different sheltering characteristics, and said fourteenth transparent material section is a transparent material with certain refractive index.

12. An anti-counterfeit method of random texture as said in the claim 1, wherein said inherent recognition features J are different optical characteristics appeared by texture element, and the difference of said optical characteristics can be recognized by said recognition system.

13. An anti-counterfeit method of random texture as said in the claim 12, wherein said optical characteristic is a shadow formed by the texture elements irradiated by light source.

14. An anti-counterfeit method of random texture as said in the claim 12, wherein the optical characteristic of said texture element is a spectrum characteristic and/or an interference light pattern shown by the texture element under interference condition; or a spectrum characteristic and/or an diffraction light pattern shown under diffraction condition; or an optical characteristic of said texture element is a spectrum characteristic and/or a polarized light pattern shown by the texture element under polarization condition; or an optical characteristic of said texture element is a spectrum characteristic and/or a dispersion light pattern shown by the texture element under dispersion condition; or the difference of optical characteristic of said texture element is formed via changed spectrum characteristic of radiating light source; or the difference of optical characteristic of said texture element is formed via changed intensity of radiating light source; or the difference of optical characteristic of said texture element is formed via full reflection produced by said texture element under radiating of a light source from at least one angle.

15. An anti-counterfeit method of random texture as said in the claim 1, wherein the storage way of said random features S is to, after encrypting, convert the random features S into code and to print the code onto the anti-counterfeit identification; or storage way of said random features S is to store the random features S into database; or storage way of said random features S is to directly store random distribution features of the anti-counterfeit identification into database; or storage way of said random features S is to number the anti-counterfeit identification, to print said number onto the anti-counterfeit identification, and to store the number and the corresponding random features S of the anti-counterfeit identification into database together; or storage way of said random features S is to, after encrypting, convert said random features S into code and to print the code onto the anti-counterfeit identification, and simultaneously to store the random features S into the database.

16. An anti-counterfeit method of random texture as said in the claim 1, wherein a collection area of said anti-counterfeit identification includes several collection sub-areas, when recognizing, the recognition system only picks up any one of collection sub-areas, and said collection area is a distribution area of the texture elements extracted from the texture material and stored in the recognition system.

17. An anti-counterfeit method of random texture as said in the claim 1, wherein, when recognizing, the recognition system extracts any part of a collection area, and said collection area is a distribution area of the texture elements extracted from the texture material and stored in the recognition system.

18. A recognizer used for recognizing said anti-counterfeit identification to be recognized in the any method as said in the claim 1, wherein said recognizer contains one radiating light source, and the radiating direction of said radiating light source can be set randomly in the recognizer, and the inherent recognition features J stored in said recognition system have optical characteristics allowing light source to radiate the texture element from each direction; or said recognizer contains two radiating light sources, and said two radiating light sources are at different radiating angles, and the inherent recognition features J stored in said recognition system have optical characteristics allowing light source to radiate the texture element from each direction; or said recognizer contains three radiating light sources, and said three radiating light sources are at different radiating angles, and the inherent recognition features J stored in said recognition system have optical characteristics allowing light source to radiate the texture element from each direction.

19. A recognizer used for recognizing said anti-counterfeit identification to be recognized in the any method as said in the claim 1, wherein said recognizer is set in a mobile phone and combined with a mobile phone as one set.

20. A recognizer used for recognizing said anti-counterfeit identification to be recognized in the any method as said in the claim 1, wherein said recognizer is in a manner of voice reply.

* * * * *